US012795467B2

(12) United States Patent
Akl et al.

(10) Patent No.: US 12,795,467 B2
(45) Date of Patent: Nov. 10, 2026

(54) DELTA CONFIGURATION FOR LAYER 1/LAYER 2 TRIGGERED MOBILITY

(71) Applicant: QUALCOMM Incorporated, San Diego, CA (US)

(72) Inventors: Naeem Akl, Bridgewater, NJ (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/414,877

(22) Filed: Jan. 17, 2024

(65) Prior Publication Data

US 2024/0276316 A1 Aug. 15, 2024

Related U.S. Application Data

(60) Provisional application No. 63/485,166, filed on Feb. 15, 2023.

(51) Int. Cl.

*H04W 36/00* (2009.01)
*H04W 36/32* (2009.01)
*H04W 80/02* (2009.01)

(52) U.S. Cl.

CPC . *H04W 36/0061* (2013.01); *H04W 36/00835* (2018.08); *H04W 36/32* (2013.01); *H04W 80/02* (2013.01)

(58) Field of Classification Search

None

See application file for complete search history.

(56) References Cited

U.S. PATENT DOCUMENTS

2021/0259038 A1* 8/2021 Paterson ........... H04W 36/0033
2024/0049085 A1* 2/2024 Tseng ................ H04W 36/0055

(Continued)

OTHER PUBLICATIONS

Guo Y (Intel Corporation)., et al., "Discussion on Configurations for Multiple Candidate Cells of L1 L2 Mobility", 3GPP TSG-RAN WG2 Meeting #120, R2-2211456, Type Discussion, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 4 Pages, XP052215565, 1. Introduction, 2. Discussion, Proposals 1-4.

(Continued)

*Primary Examiner* — Hassan A Phillips
*Assistant Examiner* — Gautam Sharma
(74) *Attorney, Agent, or Firm* — QUALCOMM Incorporated

(57) ABSTRACT

Various aspects of the present disclosure generally relate to wireless communication. In some aspects, a user equipment (UE) may receive a reference layer 1/layer 2 triggered mobility (LTM) configuration indicating one or more reference special cell (SpCell) configurations and zero or more reference secondary cell (SCell) configurations. The UE may receive one or more candidate cell group configurations, each of the one or more candidate cell group configurations indicating one or more delta configurations with respect to at least one of the one or more reference SpCell configurations or the zero or more reference SCell configurations. The UE may perform an LTM procedure associated with a selected candidate cell group configuration, of the one or more candidate cell group configurations. Numerous other aspects are described.

20 Claims, 16 Drawing Sheets

(56) References Cited

U.S. PATENT DOCUMENTS

| | | | | |
|---|---|---|---|---|
| 2024/0147315 | A1* | 5/2024 | Park | H04W 36/0058 |
| 2024/0155445 | A1* | 5/2024 | Hwang | H04W 36/0083 |
| 2024/0179602 | A1* | 5/2024 | Damnjanovic | H04W 36/362 |
| 2024/0205771 | A1* | 6/2024 | Zhang | H04W 36/0079 |
| 2024/0224127 | A1* | 7/2024 | Chandrashekar | H04W 12/04 |
| 2024/0224128 | A1* | 7/2024 | Chandrashekar | H04W 16/28 |
| 2024/0267807 | A1* | 8/2024 | Peng | H04L 1/1812 |

OTHER PUBLICATIONS

International Search Report and Written Opinion—PCT/US2024/011979—ISA/EPO—May 21, 2024.

Kimba B (VIVO)., et al., "Discussion on L1/L2-Triggered Mobility", 3GPP TSG-RAN WG3 Meeting #118, R3-226331, Type Discussion, 3rd Generation Partnership Project, Mobile Competence Centre, 650, Route Des Lucioles, F-06921 Sophia-Antipolis Cedex, France, vol. 3GPP RAN 3, No. Toulouse, FR, Nov. 14, 2022-Nov. 18, 2022, Nov. 4, 2022, 9 Pages, XP052223815, 1 Introduction, 2 Discussion (p. 2), figures 1,2, 4 Conclusion.

Lecompte D (Huawei)., et al., "Configuration of Candidate Target Configurations (Pre-configurations) for LTM", 3GPP TSG-RAN2 Meeting #120, R2-2212069, Type Discussion, NR_MOB_ENH2-Core, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 5 Pages, XP052216158, 1 Introduction, 2.2 Delta signalling for LTM pre-configurations, 3 Conclusion.

* cited by examiner

DELTA CONFIGURATION FOR LAYER 1/LAYER 2 TRIGGERED MOBILITY

CROSS-REFERENCE TO RELATED APPLICATION

This patent application claims priority to U.S. Provisional Patent Application No. 63/485,166, filed on Feb. 15, 2023, entitled "DELTA CONFIGURATION FOR LAYER 1/LAYER 2 TRIGGERED MOBILITY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for delta configurations for layer 1/layer 2 triggered mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a reference layer 1/layer 2 triggered mobility (LTM) configuration indicating one or more reference special cell (SpCell) configurations and zero or more reference secondary cell (SCell) configurations. The method may include receiving one or more candidate cell group configurations, each of the one or more candidate cell group configurations indicating one or more delta configurations with respect to at least one of the one or more reference SpCell configurations or the zero or more reference SCell configurations. The method may include performing an LTM procedure associated with a selected candidate cell group configuration, of the one or more candidate cell group configurations.

Some aspects described herein relate to a method of wireless communication performed by a network node. The method may include transmitting, to a UE, a reference LTM configuration indicating one or more reference SpCell configurations and zero or more reference SCell configurations. The method may include transmitting, to the UE, one or more candidate cell group configurations, each of the one or more candidate cell group configurations indicating one or more delta configurations with respect to at least one of the one or more reference SpCell configurations or the zero or more reference SCell configurations. The method may include triggering, at the UE, an LTM procedure associated with a selected candidate cell group configuration, of the one or more candidate cell group configurations.

Some aspects described herein relate to a method of wireless communication performed by a first network node. The method may include receiving, from a second network node, an indication of a reference LTM configuration. The method may include identifying, based at least in part on the reference LTM configuration, one or more candidate cell configurations associated with one or more candidate cells for an LTM procedure. The method may include transmitting, to the second network node, an indication of the one or more candidate cell configurations.

Some aspects described herein relate to a method of wireless communication performed by a first network node. The method may include receiving, from a second network node, an indication of one or more candidate cell configurations associated with one or more candidate cells for an LTM procedure. The method may include identifying, based at least in part on the one or more candidate cell configurations and a reference LTM configuration, one or more delta configurations with respect to the reference LTM configuration for the one or more candidate cells. The method may include transmitting, to a UE, an indication of the one or more delta configurations.

Some aspects described herein relate to a UE for wireless communication. The UE may include a memory and one or more processors coupled to the memory. The one or more processors may be configured to receive a reference LTM configuration indicating one or more reference SpCell configurations and zero or more reference SCell configurations.

The one or more processors may be configured to receive one or more candidate cell group configurations, each of the one or more candidate cell group configurations indicating one or more delta configurations with respect to at least one of the one or more reference SpCell configurations or the zero or more reference SCell configurations. The one or more processors may be configured to perform an LTM procedure associated with a selected candidate cell group configuration, of the one or more candidate cell group configurations.

Some aspects described herein relate to a network node for wireless communication. The network node may include a memory and one or more processors coupled to the memory. The one or more processors may be configured to transmit, to a UE, a reference LTM configuration indicating one or more reference SpCell configurations and zero or more reference SCell configurations. The one or more processors may be configured to transmit, to the UE, one or more candidate cell group configurations, each of the one or more candidate cell group configurations indicating one or more delta configurations with respect to at least one of the one or more reference SpCell configurations or the zero or more reference SCell configurations. The one or more processors may be configured to trigger, at the UE, an LTM procedure associated with a selected candidate cell group configuration, of the one or more candidate cell group configurations.

Some aspects described herein relate to a first network node for wireless communication. The first network node may include a memory and one or more processors coupled to the memory. The one or more processors may be configured to receive, from a second network node, an indication of a reference LTM configuration. The one or more processors may be configured to identify, based at least in part on the reference LTM configuration, one or more candidate cell configurations associated with one or more candidate cells for an LTM procedure. The one or more processors may be configured to transmit, to the second network node, an indication of the one or more candidate cell configurations.

Some aspects described herein relate to a first network node for wireless communication. The first network node may include a memory and one or more processors coupled to the memory. The one or more processors may be configured to receive, from a second network node, an indication of one or more candidate cell configurations associated with one or more candidate cells for an LTM procedure. The one or more processors may be configured to identify, based at least in part on the one or more candidate cell configurations and a reference LTM configuration, one or more delta configurations with respect to the reference LTM configuration for the one or more candidate cells. The one or more processors may be configured to transmit, to a UE, an indication of the one or more delta configurations.

Some aspects described herein relate to a non-transitory computer-readable medium that stores a set of instructions for wireless communication by a UE. The set of instructions, when executed by one or more processors of the UE, may cause the UE to receive a reference LTM configuration indicating one or more reference SpCell configurations and zero or more reference SCell configurations. The set of instructions, when executed by one or more processors of the UE, may cause the UE to receive one or more candidate cell group configurations, each of the one or more candidate cell group configurations indicating one or more delta configurations with respect to at least one of the one or more reference SpCell configurations or the zero or more reference SCell configurations. The set of instructions, when executed by one or more processors of the UE, may cause the UE to perform an LTM procedure associated with a selected candidate cell group configuration, of the one or more candidate cell group configurations.

Some aspects described herein relate to a non-transitory computer-readable medium that stores a set of instructions for wireless communication by a network node. The set of instructions, when executed by one or more processors of the network node, may cause the network node to transmit, to a UE, a reference LTM configuration indicating one or more reference SpCell configurations and zero or more reference SCell configurations. The set of instructions, when executed by one or more processors of the network node, may cause the network node to transmit, to the UE, one or more candidate cell group configurations, each of the one or more candidate cell group configurations indicating one or more delta configurations with respect to at least one of the one or more reference SpCell configurations or the zero or more reference SCell configurations. The set of instructions, when executed by one or more processors of the network node, may cause the network node to trigger, at the UE, an LTM procedure associated with a selected candidate cell group configuration, of the one or more candidate cell group configurations.

Some aspects described herein relate to a non-transitory computer-readable medium that stores a set of instructions for wireless communication by a first network node. The set of instructions, when executed by one or more processors of the first network node, may cause the first network node to receive, from a second network node, an indication of a reference LTM configuration. The set of instructions, when executed by one or more processors of the first network node, may cause the first network node to identify, based at least in part on the reference LTM configuration, one or more candidate cell configurations associated with one or more candidate cells for an LTM procedure. The set of instructions, when executed by one or more processors of the first network node, may cause the first network node to transmit, to the second network node, an indication of the one or more candidate cell configurations.

Some aspects described herein relate to a non-transitory computer-readable medium that stores a set of instructions for wireless communication by a first network node. The set of instructions, when executed by one or more processors of the first network node, may cause the first network node to receive, from a second network node, an indication of one or more candidate cell configurations associated with one or more candidate cells for an LTM procedure. The set of instructions, when executed by one or more processors of the first network node, may cause the first network node to identify, based at least in part on the one or more candidate cell configurations and a reference LTM configuration, one or more delta configurations with respect to the reference LTM configuration for the one or more candidate cells. The set of instructions, when executed by one or more processors of the first network node, may cause the first network node to transmit, to a UE, an indication of the one or more delta configurations.

Some aspects described herein relate to an apparatus for wireless communication. The apparatus may include means for receiving a reference LTM configuration indicating one or more reference SpCell configurations and zero or more reference SCell configurations. The apparatus may include means for receiving one or more candidate cell group configurations, each of the one or more candidate cell group configurations indicating one or more delta configurations with respect to at least one of the one or more reference SpCell configurations or the zero or more reference SCell configurations. The apparatus may include means for performing an LTM procedure associated with a selected candidate cell group configuration, of the one or more candidate cell group configurations.

Some aspects described herein relate to an apparatus for wireless communication. The apparatus may include means for transmitting, to a UE, a reference LTM configuration indicating one or more reference SpCell configurations and zero or more reference SCell configurations. The apparatus may include means for transmitting, to the UE, one or more candidate cell group configurations, each of the one or more candidate cell group configurations indicating one or more delta configurations with respect to at least one of the one or more reference SpCell configurations or the zero or more reference SCell configurations. The apparatus may include means for triggering, at the UE, an LTM procedure associated with a selected candidate cell group configuration, of the one or more candidate cell group configurations.

Some aspects described herein relate to an apparatus for wireless communication. The apparatus may include means for receiving, from a network node, an indication of a reference LTM configuration. The apparatus may include means for identifying, based at least in part on the reference LTM configuration, one or more candidate cell configurations associated with one or more candidate cells for an LTM procedure. The apparatus may include means for transmitting, to the network node, an indication of the one or more candidate cell configurations.

Some aspects described herein relate to an apparatus for wireless communication. The apparatus may include means for receiving, from a network node, an indication of one or more candidate cell configurations associated with one or more candidate cells for an LTM procedure. The apparatus may include means for identifying, based at least in part on the one or more candidate cell configurations and a reference LTM configuration, one or more delta configurations with respect to the reference LTM configuration for the one or more candidate cells. The apparatus may include means for transmitting, to a UE, an indication of the one or more delta configurations.

Some aspects described herein relate to a first network node for wireless communication. The first network node may include one or more memories and one or more processors coupled to the one or more memories. The one or more processors may be configured to transmit, to a second network node, an indication of a reference LTM configuration. The one or more processors may be configured to receive, from the second network node, an indication of one or more candidate cell configurations associated with one or more candidate cells for an LTM procedure, wherein the one or more candidate cell configurations are based at least in part on the reference LTM configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
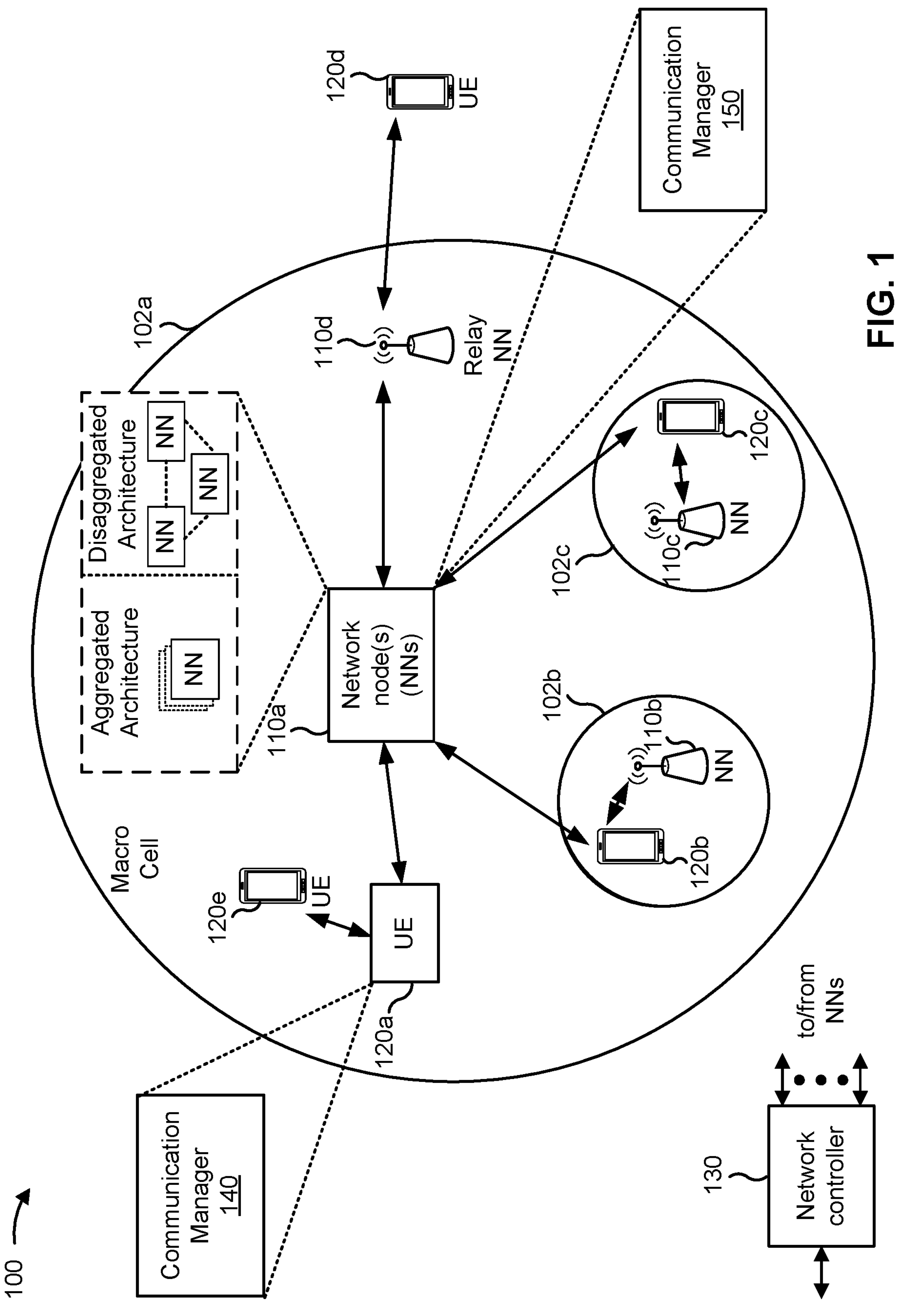
FIG. 1 is a diagram illustrating an example of a wireless network, in accordance with the present disclosure.

In some wireless networks, a user equipment (UE) may be configured to perform layer 1 (L1)/layer 2 (L2) cell changes, which is sometimes referred to a L1/L2 trigger mobility (LTM). In some cases, a UE may be configured with multiple candidate cells for an LTM procedure, such that the UE may perform multiple sequential cell changes without requiring radio resource control (RRC) reconfiguration. For example, the UE may be configured with multiple candidate cell group configurations, with each cell group configuration configuring one or more cells (e.g., a primary, or special cell (SpCell), and, optionally, one or more secondary cells (SCells)). In response to receiving a cell switch command from a network node, the UE may perform an LTM procedure to a cell and/or cell group indicated by the cell switch command by applying the respective candidate LTM configuration. After establishing a connection with the candidate cell and/or cell group, the UE may receive a subsequent cell switch command, and thus the UE may perform a subsequent LTM procedure to another cell and/or cell group indicated by the subsequent cell switch command by applying the respective candidate LTM configuration. The UE may proceed in this manner and thus perform multiple sequential L1/L2 cell switches requiring RRC reconfiguration.

In some examples, in order to reduce signaling overhead and otherwise conserve power, computing, and network resources, the various LTM configurations may be indicated to the UE as delta configurations. A delta configuration may refer to a configuration that indicates a difference between the configuration and a base, or reference, configuration, such as a source configuration of a serving cell group. In such examples, performing sequential LTM procedures without intermediate RRC reconfiguration may lead to communication errors and even radio link failure (RLF). This is because a source configuration (e.g., a configuration associated with a current serving cell group of the UE) changes with each successive cell switch, and thus applying a delta configuration, which may be configured with respect to configuration that differs from a current source configuration, may result in the UE being erroneously configured. As a result, the UE and the network node may be erroneously configured and thus may experience communication errors or RLF, requiring high power, computing, and network resource consumption to correct communication errors and/or reestablish an RRC connection with a cell group.

Some techniques and apparatuses described herein enable delta configurations with respect to a dedicated and/or separate reference configuration, thereby reducing communication errors and/or reducing the risk of RLF in connection with LTM switching. In some aspects, a UE may be configured with a reference LTM configuration (e.g., a separate LTM configuration maintained by the UE for reference purposes) that indicates one or more reference SpCell configurations and/or zero or more SCell configurations. The UE may also be configured with one or more candidate cell configurations that indicate one or more delta configurations with respect to the one or more SpCell configurations and the zero or more SCell configurations of the reference LTM configuration. In response to receiving a cell switch command, the UE may apply the candidate cell configuration based at least in part on referencing the reference LTM configuration. In that regard, a candidate cell configuration may not depend on a source cell configuration, enabling the UE to perform sequential LTM procedures without intermediate RRC reconfiguration. As a result, the UE and the network node may experience reduced communication errors or may experience a reduced risk of RLF following an LTM procedure, resulting in reduced power, computing, and network resource consumption that would otherwise be required to correct communication errors and/or reestablish an RRC connection with a cell group.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a reference LTM configuration indicating one or more reference SpCell configurations and zero or more reference SCell configurations; receive one or more candidate cell group configurations, each of the one or more candidate cell group configurations indicating one or more delta configurations with respect to at least one of the one or more reference SpCell configurations or the zero or more reference SCell configurations; and perform an LTM procedure associated with a selected candidate cell group configuration, of the one or more candidate cell group configurations. Additionally, or alternatively, the communication manager 140 may perform one or more other operations described herein.

In some aspects, the network node 110 may include a communication manager 150. As described in more detail elsewhere herein, the communication manager 150 may transmit, to a UE, a reference LTM configuration indicating one or more reference SpCell configurations and zero or more reference SCell configurations; transmit, to the UE, one or more candidate cell group configurations, each of the one or more candidate cell group configurations indicating one or more delta configurations with respect to at least one of the one or more reference SpCell configurations or the zero or more reference SCell configurations; and trigger, at the UE, an LTM procedure associated with a selected candidate cell group configuration, of the one or more candidate cell group configurations.

Additionally, or alternatively, the communication manager 150 may receive, from a second network node, an indication of a reference LTM configuration; identify, based at least in part on the reference LTM configuration, one or more candidate cell configurations associated with one or more candidate cells for an LTM procedure; and transmit, to the second network node, an indication of the one or more candidate cell configurations.

Additionally, or alternatively, the communication manager 150 may receive, from a second network node, an indication of one or more candidate cell configurations associated with one or more candidate cells for a LTM procedure; identify, based at least in part on the one or more candidate cell configurations and a reference LTM configuration, one or more delta configurations with respect to the reference LTM configuration for the one or more candidate cells; and transmit, to a UE, an indication of the one or more delta configurations. Additionally, or alternatively, the communication manager 150 may perform one or more other operations described herein.

Additionally, or alternatively, the communication manager 150 may transmit, to a second network node, an indication of a reference LTM configuration; and receive, from the second network node, an indication of one or more candidate cell configurations associated with one or more candidate cells for an LTM procedure, wherein the one or more candidate cell configurations are based at least in part on the reference LTM configuration.

As indicated above, FIG. 1 is provided as an example. Other examples may differ from what is described with regard to FIG. 1.

Figure 2:
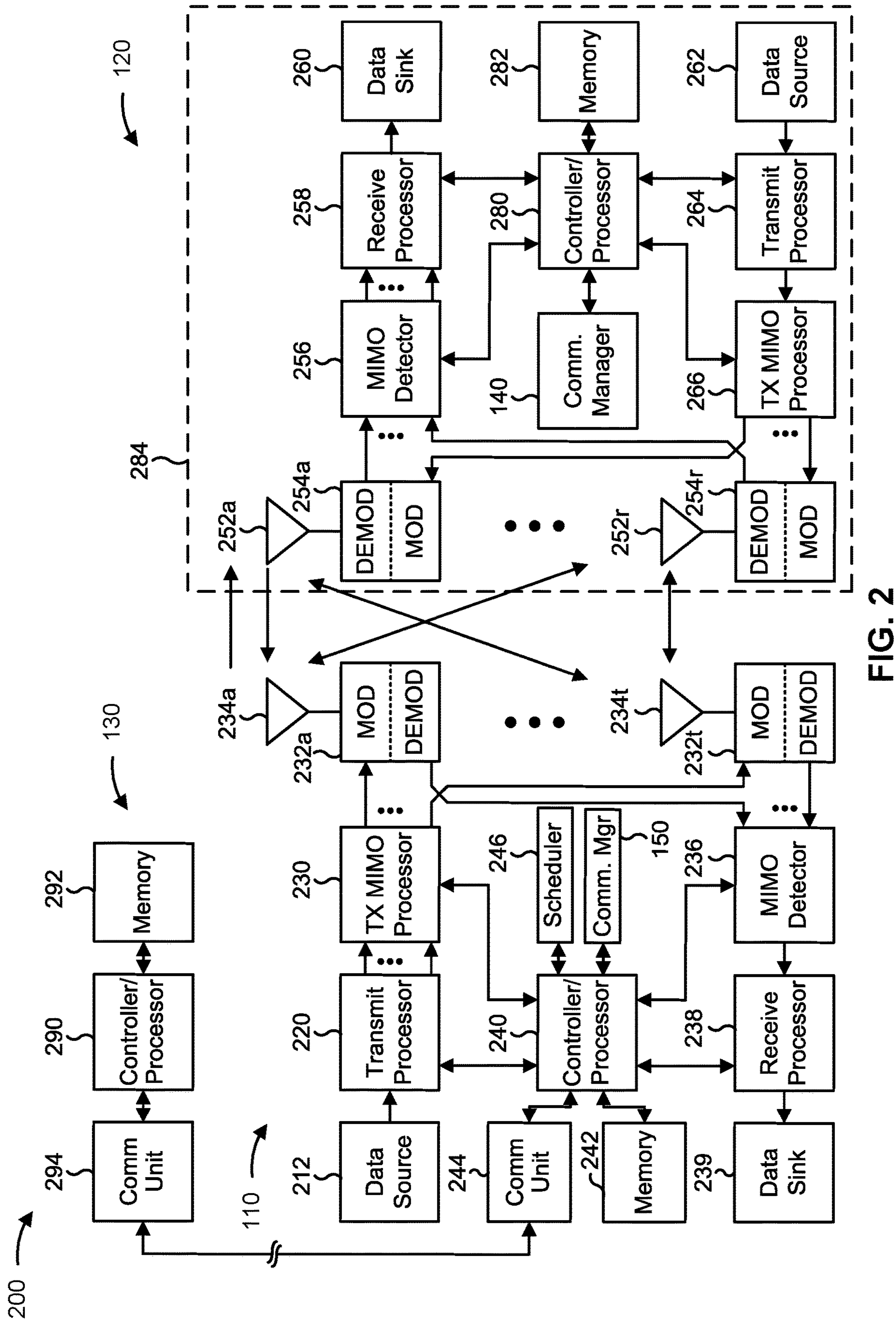
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-15).

The controller/processor 240 of the network node 110, the controller/processor 280 of the UE 120, and/or any other component(s) of FIG. 2 may perform one or more techniques associated with delta configurations for L1/L2 triggered mobility, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving a reference LTM configuration indicating one or more reference SpCell configurations and zero or more reference SCell configurations; means for receiving one or more candidate cell group configurations, each of the one or more candidate cell group configurations indicating one or more delta configurations with respect to at least one of the one or more reference SpCell configurations or the zero or more reference SCell configurations; and/or means for performing an LTM procedure associated with a selected candidate cell group configuration, of the one or more candidate cell group configurations. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, a reference LTM configuration indicating one or more reference SpCell configurations and zero or more reference SCell configurations; means for transmitting, to the UE, one or more candidate cell group configurations, each of the one or more candidate cell group configurations indicating one or more delta configurations with respect to at least one of the one or more reference SpCell configurations or the zero or more reference SCell configurations; and/or means for triggering, at the UE, an LTM procedure associated with a selected candidate cell group configuration, of the one or more candidate cell group configurations. In some other aspects, the network node 110 includes means for receiving, from a second network node, an indication of a reference LTM configuration; means for identifying, based at least in part on the reference LTM configuration, one or more candidate cell configurations associated with one or more candidate cells for an LTM procedure; and/or means for transmitting, to the second network node, an indication of the one or more candidate cell configurations. In some other aspects, the network node 110 includes means for receiving, from a second network node, an indication of one or more candidate cell configurations associated with one or more candidate cells for an LTM procedure; means for identifying, based at least in part on the one or more candidate cell configurations and a reference LTM configuration, one or more delta configurations with respect to the reference LTM configuration for the one or more candidate cells; and/or means for transmitting, to a UE, an indication of the one or more delta configurations. In some other aspects, the network node 110 includes means for transmitting, to a second network node, an indication of a reference LTM configuration; and means for receiving, from the second network node, an indication of one or more candidate cell configurations associated with one or more candidate cells for an LTM procedure, wherein the one or more candidate cell configurations are based at least in part on the reference LTM configuration. The means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
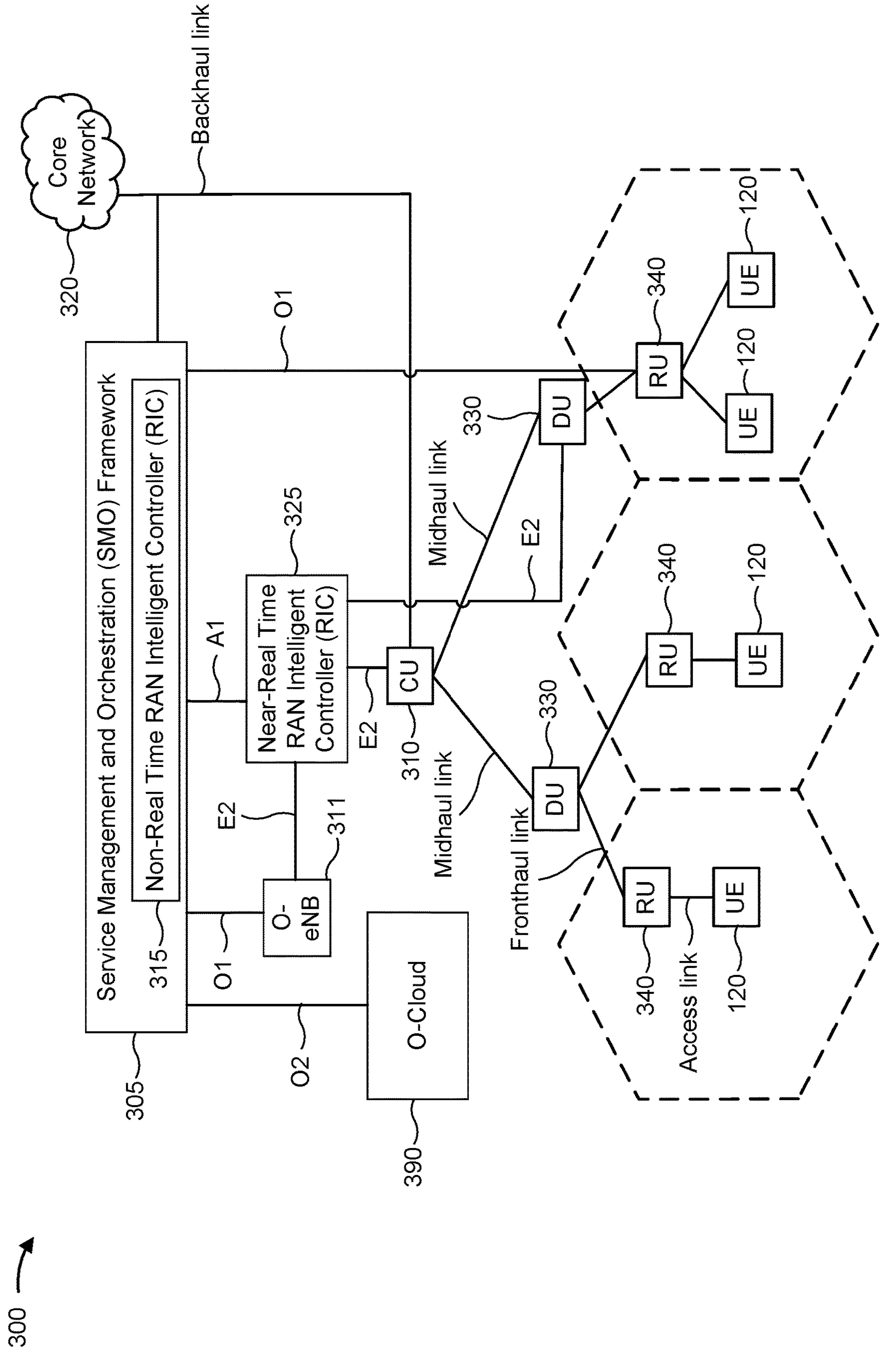
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
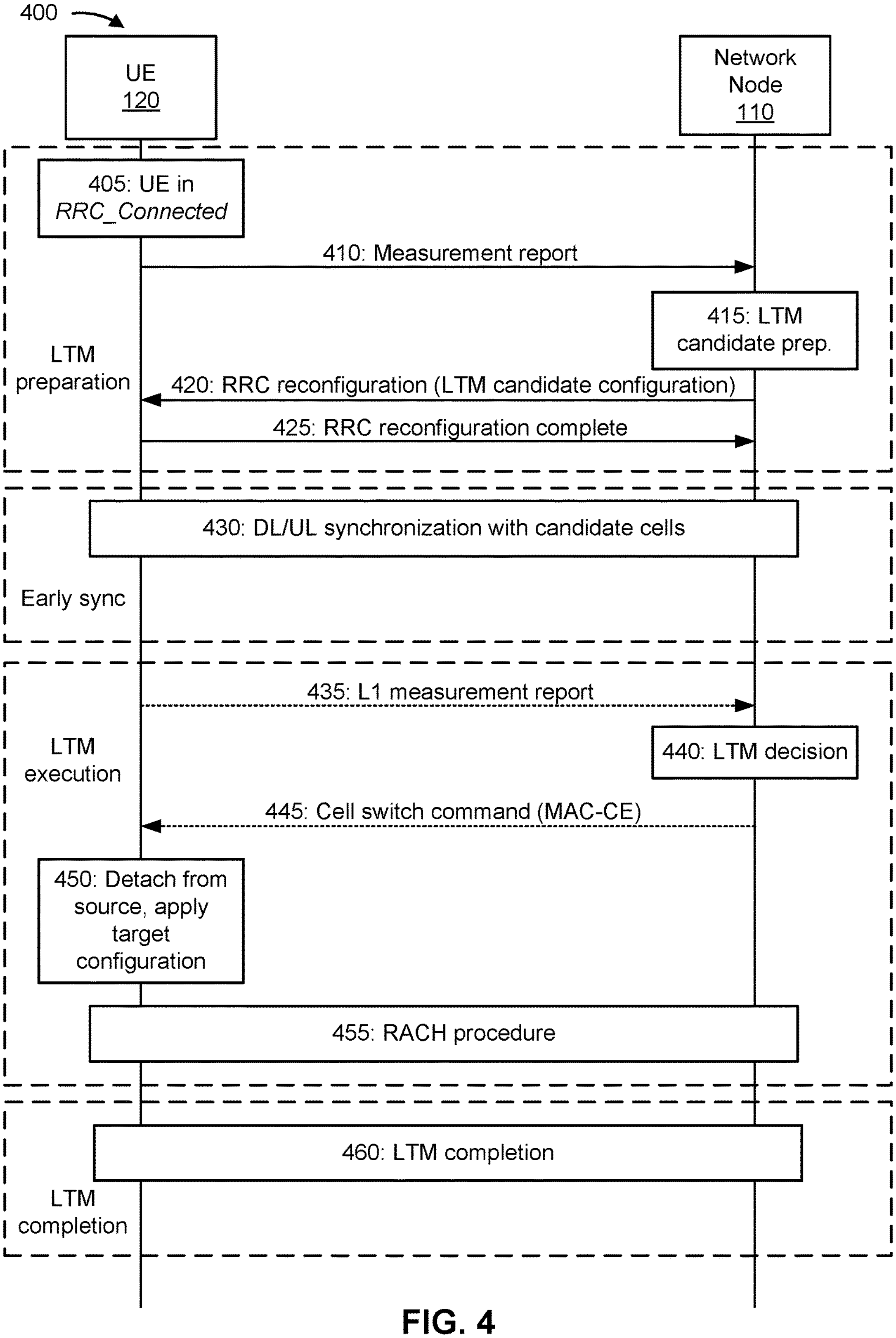
FIG. 4 is a diagram illustrating an example of a layer 1/layer 2 triggered mobility (LTM) procedure, in accordance with the present disclosure.

FIG. 4 is a diagram illustrating an example 400 of an LTM procedure, in accordance with the present disclosure.

In some examples, a network node 110 may instruct a UE 120 to change serving cells, such as when the UE 120 moves away from coverage of a current serving cell (sometimes referred to as a source cell) and towards coverage of a neighboring cell (sometimes referred to as a target cell). In some cases, the network node 110 may instruct the UE 120 to change cells using a layer 3 (L3) handover procedure. An L3 handover procedure may include the network node 110 transmitting, to the UE 120, an RRC reconfiguration message indicating that the UE 120 should perform a handover procedure to a target cell, which may be transmitted in response to the UE 120 providing the network node 110 with an L3 measurement report indicating signal strength measurements associated with various cells (e.g., measurements associated with the source cell and one or more neighboring cells). In response to receiving the RRC reconfiguration message, the UE 120 may communicate with the source cell and the target cell to detach from the source cell and connect to the target cell (e.g., the UE 120 may establish an RRC connection with the target cell). Once handover is complete, the target cell may communicate with a user plane function (UPF) of a core network to instruct the UPF to switch a user plane path of the UE 120 from the source cell to the target cell. The target cell may also communicate with the source cell to indicate that handover is complete and that the source cell may be released.

L3 handover procedures may be associated with high latency and high overhead due to the multiple RRC reconfiguration messages and/or other L3 signaling and operations used to perform the handover procedures. Accordingly, in some examples, a UE 120 may be configured to perform a lower-layer (e.g., L1 and/or L2) handover procedure, sometimes referred to an LTM procedure, such as the example 400 LTM procedure shown in FIG. 4. As shown in FIG. 4, the LTM procedure may include four phases: an LTM preparation phase, an early synchronization phase (shown as "early sync" in FIG. 4), an LTM execution phase, and/or an LTM completion phase.

During the LTM preparation phase, and as indicated by reference number 405, the UE 120 may be in an RRC connected state (sometimes referred to as RRC_Connected) with a source cell. As indicated by reference number 410, the UE 120 may transmit, and the network node 110 may receive, a measurement report (sometimes referred to as a MeasurementReport), which may be an L3 measurement report. The measurement report may indicate signal strength measurements (e.g., RSRP, RSSI, RSRQ, and/or CQI) or similar measurements associated with the source cell and/or one or more neighboring cells. In some examples, based at least in part on the measurement report or other information, the network node 110 may decide to use LTM, and thus, as indicated by reference number 415, the network node 110 may initiate LTM candidate preparation.

As shown by reference number 420, the network node 110 may transmit, and the UE 120 may receive, an RRC reconfiguration message (sometimes referred to as an RRCReconfiguration message), which may include an LTM candidate configuration. More particularly, the RRC reconfiguration message may indicate a configuration of one or more LTM candidate target cells, which may be candidate cells to become a serving cell of the UE and/or cells for which the UE 120 may later be triggered to perform an LTM procedure. As shown by reference number 425, the UE 120 may store the configuration of the one or more LTM candidate cell configurations and, in response, may transmit, to the network node 110, an RRC reconfiguration complete message (sometimes referred to as an RRCReconfiguration-Complete message).

During the early synchronization phase, and as indicated by reference number 430, the UE 120 may optionally perform downlink/uplink synchronization with the candidate cells associated with the one or more LTM candidate cell configurations. For example, the UE 120 may perform downlink synchronization and timing advance acquisition with the one or more candidate target cells prior to receiving an LTM switch command (which is described in more detail below in connection with reference number 445). In some aspects, performing the early synchronization with the one or more candidate cells may reduce latency associated with performing a random access channel (RACH) procedure later in the LTM procedure, which is described in more detail below in connection with reference number 455.

During the LTM execution phase, and as indicated by reference number 435, the UE 120 may perform L1 measurements on the configured LTM candidate target cells, and thus may transmit, to the network node 110, lower-layer (e.g., L1) measurement reports. As indicated by reference number 440, based at least in part on the lower-layer measurement reports, the network node 110 may decide to execute an LTM cell switch to a target cell. Accordingly, as shown by reference number 445, the network node 110 may transmit, and the UE 120 may receive, a MAC control element (MAC-CE) or similar message triggering an LTM cell switch (the MAC-CE or similar message is sometimes referred to herein as a cell switch command). The cell switch command may include an indication of a candidate configuration index associated with the target cell. As shown by reference number 450, based at least in part on receiving the cell switch command, the UE 120 may switch to the configuration of the LTM candidate target cell (e.g., the UE 120 may detach from the source cell and apply the target cell configuration). Moreover, as shown by reference number 455, the UE 120 may perform a RACH procedure towards the target cell, such as when a timing advance associated with the target cell is not available (e.g., in examples in which the UE 120 did not perform the early synchronization as described above in connection with reference number 430).

During the LTM completion phase, and as indicated by reference number 460, the UE 120 may indicate successful completion of the LTM cell switch towards the target cell. In this way, cell switch to a target cell may be performed using less overhead than for an L3 handover procedure and/or a cell switch to a target cell may be associated with reduced latency as compared to L3 handover procedure. Aspects of an LTM candidate cell configuration are described in more detail below in connection with FIG. 5.

As indicated above, FIG. 4 is provided as an example. Other examples may differ from what is described with respect to FIG. 4.

Figure 5:
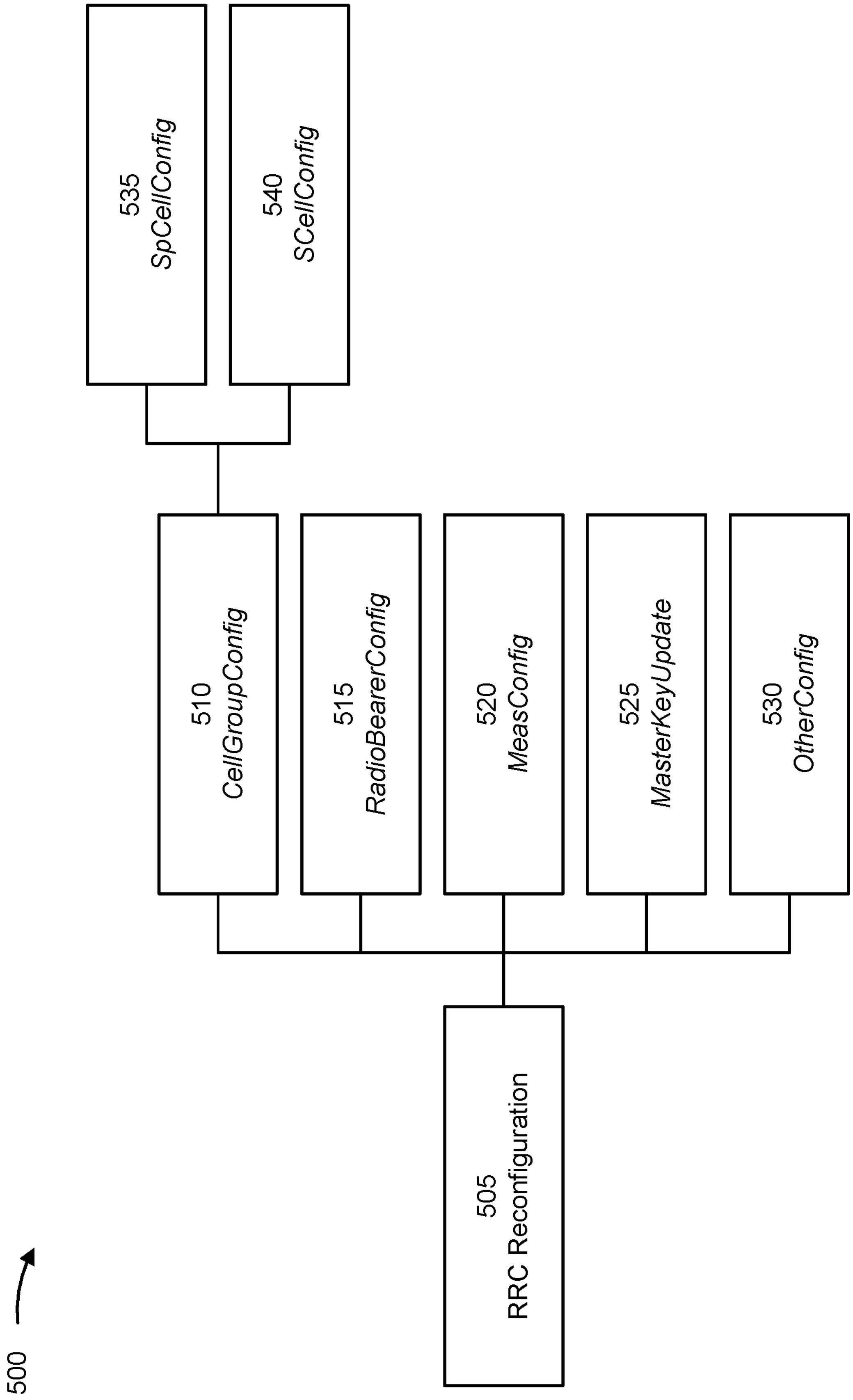
FIG. 5 is a diagram illustrating an example of radio resource control modeling associated with an LTM procedure, in accordance with the present disclosure.

FIG. 5 is a diagram illustrating an example 500 of RRC modeling associated with an LTM procedure, in accordance with the present disclosure.

As described above in connection with FIG. 4, in some examples, LTM may be configured via RRC, and, more particularly, via an RRC reconfiguration message 505 (e.g., the RRC reconfiguration message described above in connection with reference number 420). In some examples, the RRC reconfiguration message 505 may indicate certain data structures and/or information elements (IEs), such as a cell group configuration 510 (sometimes referred to as a CellGroupConfig IE), a radio bearer configuration 515 (sometimes referred to as a RadioBearerConfig IE), a measurement configuration 520 (sometimes referred to as a MeasConfig IE), a master key update configuration 525 (sometimes referred to as a MasterKeyUpdate IE), and/or other configuration information 530 (sometimes referred to as an OtherConfig IE).

In some aspects, the cell group configuration 510 may include configuration information associated with one or more target cells. For example, CellGroupConfig IE may be used to configure a master cell group (MCG) or a secondary cell group (SCG). A cell group may include one MAC entity, a set of logical channels with associated RLC entities, a primary cell associated with the corresponding MCG or the corresponding SCG (e.g., a primary cell (PCell) in the case of an MCG or a primary secondary cell (PSCell) in the case of an SCG, with each being more broadly referred to as an SpCell), and one or more SCells associated with the corresponding MCG or the corresponding SCG. In that regard, the cell group configuration 510 may include one or more SpCell configurations 535 (sometimes referred to as an SpCellConfig IE), and/or one or more SCell configurations 540 (sometimes referred to as an SCellConfig IE).

In some aspects, a serving cell index IE (sometimes referred to as a ServCellIndex IE) may indicate a short identity used to uniquely identify a serving cell (e.g., indicate the SpCell or an SCell as the serving cell). For example, the serving cell index IE may indicate value "0" when the SpCell is the serving cell, and may indicate an SCell index value (sometimes referred to SCellIndex) of a corresponding SCell when an SCell is the serving cell. The SCell index value may be a value previously assigned to the one or more SCells via the CellGroupConfig IE. For example, the CellGroupConfig IE may include an SCell to add/modify list parameter (sometimes referred to as SCellToAddModList) and/or an SCell to release list (sometimes referred to as SCellToRelease) that may be used to indicate SCell indexes associated with the one or more SCells.

In some examples, a UE 120 may be configured with one RRC reconfiguration message 505 for each candidate LTM configuration (which is sometimes referred to as "RRC model 1"). That is, each candidate LTM configuration may be indicated to the UE via a respective RRC reconfiguration message 505. In some other examples, a UE 120 may be configured with a single RRC reconfiguration message 505 including multiple candidate LTM configurations (which is sometimes referred to as "RRC model 2"). For example, an RRC reconfiguration message 505 may include multiple cell group configurations 510 (e.g., multiple CellGroupConfig IEs), one for each candidate LTM configuration. In that regard, each candidate LTM configuration may be associated with a configuration identifier (ID) and a cell group configuration 510 (e.g., a CellGroupConfig IE), and, optionally, a radio bearer configuration 515 (e.g., a RadioBearerConfig IE) and/or a measurement configuration 520 (e.g., a MeasConfig IE), among other information.

In some examples, candidate LTM configurations may only be modified and/or released by the network. For example, candidate LTM configuration may be added and/or modified by the network using a "ToAddMod" data structure (e.g., SCellToAddModList or a similar data structure), and/or candidate LTM configurations may be released by the network using a "ToRelease" data structure (e.g., SCellToReleaseList or a similar data structure). Moreover, in some examples, sequential L1/L2 cell changes between candidate cells and/or cell groups may be performed without requiring RRC reconfiguration. Sequential L1/L2 cell changes are described in more detail below in connection with FIG. 6.

As indicated above, FIG. 5 is provided as an example. Other examples may differ from what is described with respect to FIG. 5.

Figure 6:
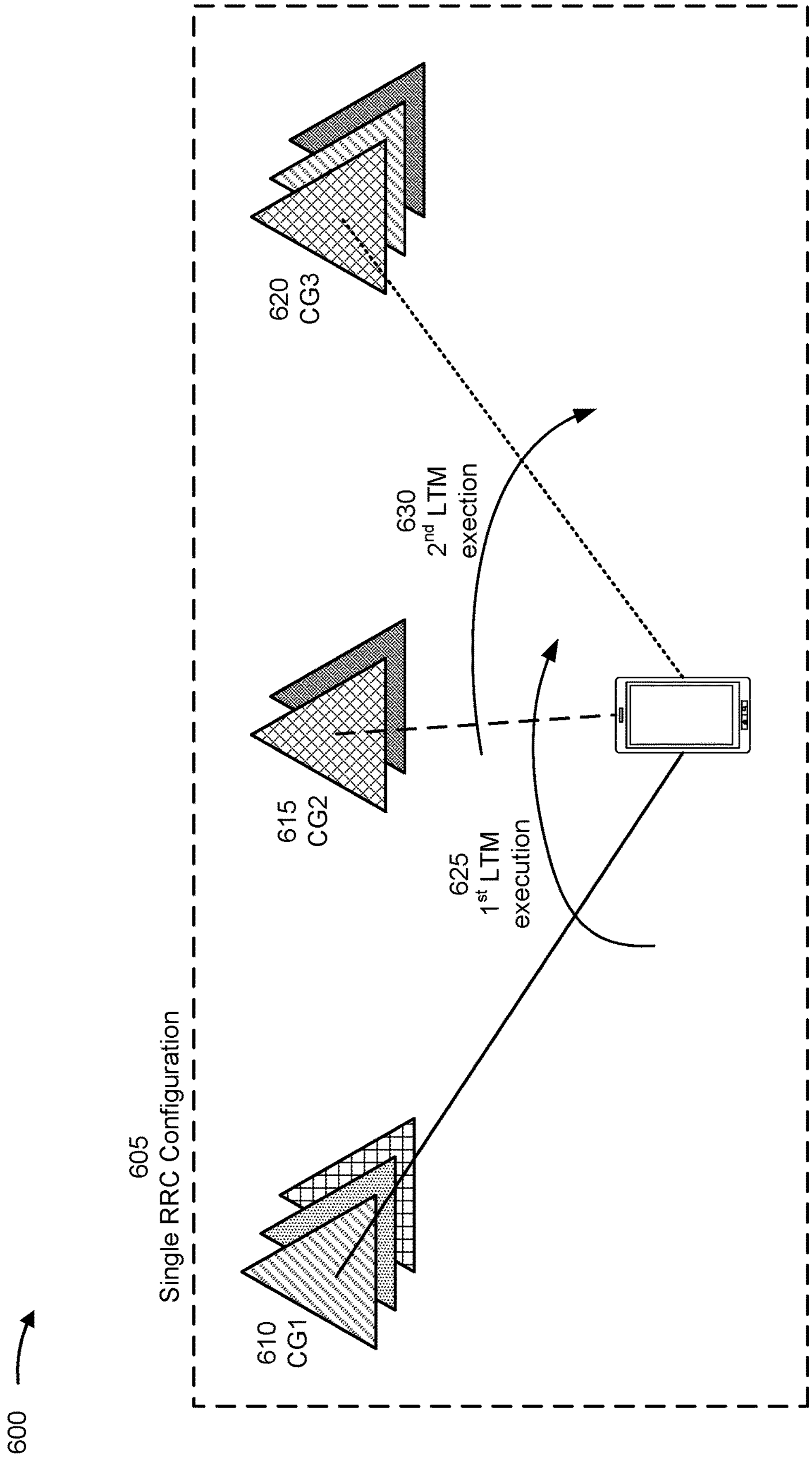
FIG. 6 is a diagram illustrating an example of sequential LTM executions, in accordance with the present disclosure.

FIG. 6 is a diagram illustrating an example 600 of sequential LTM executions, in accordance with the present disclosure.

As shown in FIG. 6, a UE 120 may be configured with a single RRC configuration 605 that supports sequential L1/L2 cell changes (e.g., the UE 120 may not need to be RRC reconfigured between sequential cell changes). More particularly, the single RRC configuration 605 may configure the UE 120 with multiple candidate cell group configurations (e.g., multiple CellGroupConfig IEs), as described above in connection with FIG. 5, such that the UE 120 may perform sequential L1/L2 cell switching without RRC reconfiguration. In the example shown in FIG. 6, the UE 120 may be configured with a configuration of a first cell group 610 (shown as "CG1"), a configuration of a second cell group 615 (shown as "CG2"), and a configuration of a third cell group 620 (shown as "CG3"), among other cell group configurations. Each cell group may include one or more cells, such as an SpCell and one or more SCells. In some examples, some cells may be included in multiple cell groups, while, in some other examples, some cell groups may include distinct cells from other cell groups. Additionally, or alternatively, certain cell groups may include more or less cells than other cell groups. For example, in the example 600 depicted in FIG. 6, the first cell group 610 and the third cell group 620 may be associated with three cells, while the second cell group 615 may be associated with two cells.

In some aspects, the UE 120 may receive a cell switch command from a network node 110, and may perform an LTM procedure in a similar manner as described above in connection with reference numbers 435-455 of FIG. 4. For example, the UE 120 may be initially connected to the first cell group 610, and may receive a cell switch command from the network node 110 indicating that the UE is to perform an LTM procedure to the second cell group 615. Accordingly, the UE 120 may perform a first LTM execution, as indicated by reference number 625. After attaching to the second cell group 615, the UE 120 (without being RRC reconfigured) may receive another cell switch command from the network node 110, indicating that the UE is to perform an LTM procedure to the third cell group 620. Accordingly, the UE 120 may perform a second LTM execution, as indicated by reference number 630.

In some examples, in order to reduce signaling overhead and otherwise conserve power, computing, and network resources, the various LTM configurations may be indicated to the UE 120 as delta configurations. A delta configuration may refer to a configuration that indicates a difference between the configuration and a base, or reference, configuration, such as a source configuration of a serving cell group. Put another way, a UE 120 may be configuration with one or more delta configurations associated with a candidate LTM configuration, which may be defined on top of a reference configuration (e.g., a source configuration of a current serving cell group). In such examples, performing successive LTM procedures without intermediate RRC reconfiguration, such as described above in connection with reference numbers 625 and 630, may lead to communication errors and even RLF. This is because a source configuration (e.g., a configuration associated with a current serving cell group of the UE 120) changes with each successive cell switch, and thus applying a delta configuration (which may have been configured using a different source configuration as a base or reference configuration) to a current source configuration, may result in the UE 120 being erroneously configured. As a result, the UE 120 and the network node 110 may experience communication errors or RLF, requiring high power, computing, and network resource consumption to correct communication errors and/or reestablish an RRC connection with a cell group.

Some techniques and apparatuses described herein enable delta configurations with respect to a dedicated and/or separate reference configuration, thereby reducing communication errors and/or reducing the risk of RLF in connection with LTM switching. In some aspects, a UE 120 may be configured with a reference LTM configuration (e.g., a separate LTM configuration maintained by the UE 120 for reference purposes) that indicates one or more reference SpCell configurations and/or zero or more reference SCell configurations. The UE 120 may also be configured with one or more candidate cell configurations that indicate one or more delta configurations with respect to the one or more reference SpCell configurations and the zero or more reference SCell configurations. In response to receiving a cell switch command, the UE 120 may apply the candidate cell configuration based at least in part on referencing the reference LTM configuration and the corresponding delta configurations. In that regard, a candidate cell configuration may not depend on a source cell configuration, permitting the UE 120 to perform sequential LTM procedures without intermediate RRC reconfiguration. As a result, the UE 120 and the network node 110 may experience reduced communication errors or may reduce the risk of RLF following an LTM procedure, resulting in reduced power, computing, and network resource consumption that would otherwise be required to correct communication errors and/or reestablish an RRC connection with a cell group.

As indicated above, FIG. 6 is provided as an example. Other examples may differ from what is described with respect to FIG. 6.

Figure 7:
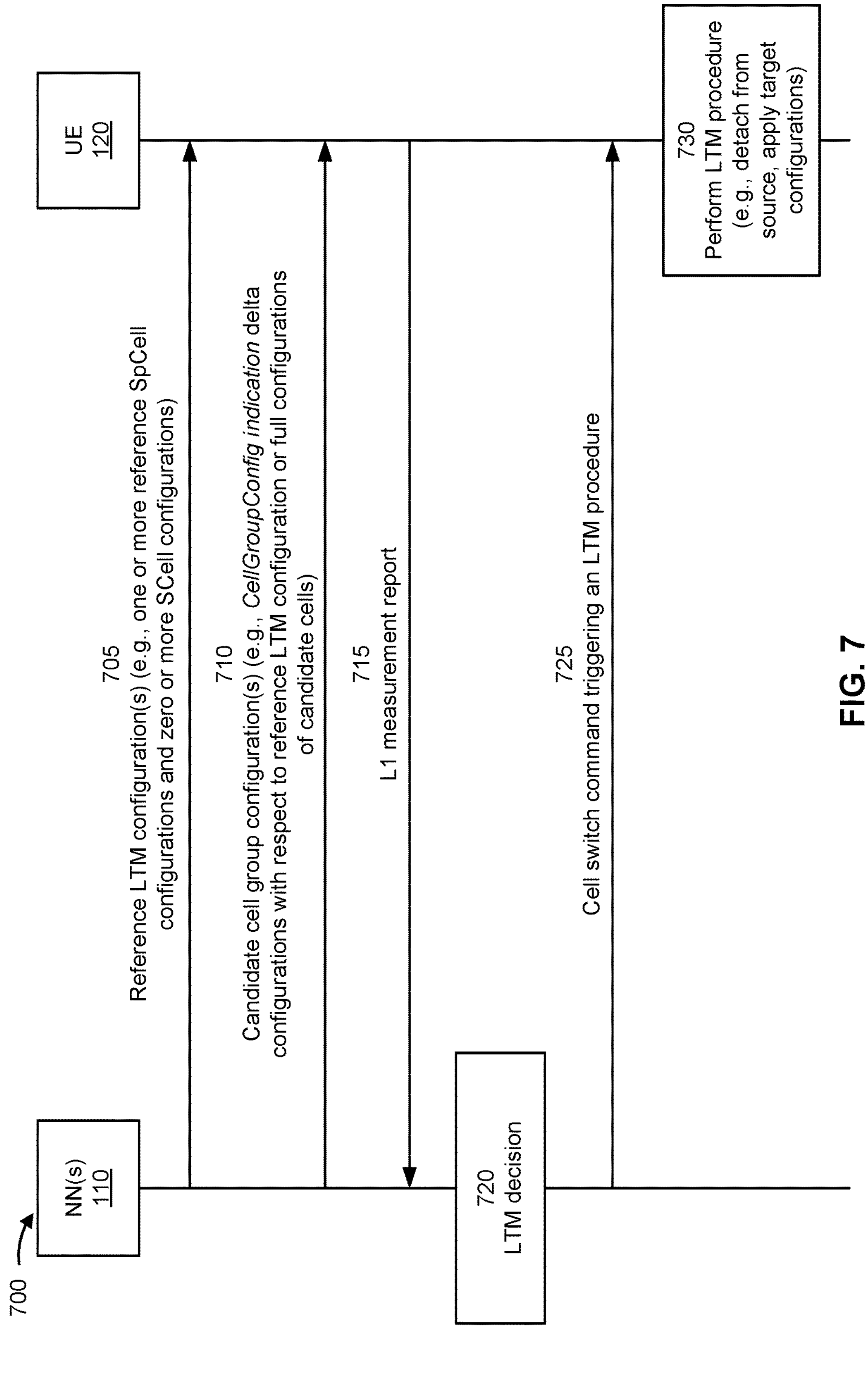
FIG. 7 is a diagram of an example associated with delta configurations for LTM, in accordance with the present disclosure.

FIG. 7 is a diagram of an example 700 associated with delta configurations for LTM, in accordance with the present disclosure. As shown in FIG. 7, a network node 110 (e.g., a CU, a DU, and/or an RU) may communicate with a UE 120. In some aspects, the network node 110 and the UE 120 may be part of a wireless network (e.g., wireless network 100). The network node 110 and the UE 120 may have established a wireless connection prior to operations shown in FIG. 7. In some aspects, the network node 110 and/or the UE 120 may have a capability to perform LTM procedures, such as the LTM procedures describe above in connection with FIGS. 4-6.

As shown by reference numbers 705 and 710, the network node 110 may transmit, and the UE 120 may receive, configuration information. In some aspects, the UE 120 may receive the configuration information via one or more of RRC signaling, one or more MAC-CEs, and/or downlink control information (DCI), among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

As shown by reference number 705, in some aspects the configuration information may include one or more reference LTM configurations. Each of the one or more reference LTM configurations may indicate one or more reference cell configurations, such as one or more reference SpCell configurations and zero or more reference SCell configurations. Put another way, each of the one or more reference LTM configurations may include at least one reference SpCell configuration, and, optionally, one or more reference SCell configurations.

As shown by reference number 710, in some aspects, the configuration information may include one or more candidate cell group configurations (e.g., one or more CellGroupConfig IEs). In some aspects, such as in aspects employing RRC model 1 described above in connection with FIG. 5, the UE 120 may be configured with the one or more candidate cell group configurations using separate RRC configurations for each candidate cell group configuration, with each of the separate RRC configurations including a corresponding CellGroupConfig IE indicating the candidate cell group configuration. In some other aspects, such as in aspects employing RRC model 2 described above in connection with FIG. 5, the UE 120 may be configured with the one or more candidate cell group configurations using a single RRC configuration for all of the one or more candidate cell group configurations, with the single RRC configuration including a corresponding CellGroupConfig IE for each candidate cell group configuration.

In some aspects, each of the one or more candidate cell group configurations (e.g., each of the one or more CellGroupConfig IEs) may indicate one or more delta configurations with respect to at least one of the one or more reference SpCell configurations or the zero or more reference SCell configurations (e.g., the delta configurations may be configured with respect to the separate reference LTM configuration and/or the one or more reference cell configurations associated with reference LTM configuration). The UE 120 may store the reference configuration separate from a source configuration (e.g., store the reference configuration in a separate location and/or with a separate designation), such that, if the UE 120 changes source cells via an LTM procedure, the UE 120 may perform subsequent L1/L2 cell switching with requiring RRC reconfiguration. More particularly, when a subsequent LTM procedure is triggered, the UE 120 may apply the candidate cell group configuration associated with the subsequently indicated cell group, which may be a delta configuration with respect to the reference LTM configuration rather than a current source cell configuration.

In some aspects, the reference LTM configuration may include a single reference SpCell configuration and, optionally, a single reference SCell configuration (e.g., the reference LTM configuration may include a single reference SCell configuration when one or more candidate SCells are being configured). In such aspects, a candidate cell group configuration (e.g., a CellGroupConfig IE) may be associated with a candidate SpCell configuration that is configured as a delta configuration with respect to the reference SpCell configuration. Moreover, in aspects in which one or more candidate SCells are configured, a candidate cell group configuration may be associated with one or more candidate SCell configurations, with each of the one or more candidate SCell configurations being configured as a delta configuration with respect to the reference SCell configuration.

In some aspects, the reference LTM configuration may include a single reference SpCell configuration and, optionally, one or more reference SCell configurations (e.g., the reference LTM configuration may include one or more SCell configurations when one or more candidate SCells are being configured). In such aspects, a candidate cell group configuration (e.g., a CellGroupConfig IE) may be associated with a candidate SpCell configuration that is configured as a delta configuration with respect to the reference SpCell configuration. Moreover, in aspects in which one or more candidate SCells are configured, the reference LTM configuration may include one or more reference SCell configurations, each associated with a respective SCell index (e.g., SCellIndex, as indicated using SCellToAddModList and/or SCellToReleaseList), and a candidate cell group configuration may include one or more candidate SCell configurations, each also associated with a respective SCell index. In such aspects, each candidate SCell configuration, of the one or more candidate SCell configurations, may be configured as a delta configuration with respect to a reference SCell configuration associated with a same respective SCell index as the candidate SCell configuration. For example, a candidate SCell associated with SCell index “5” may be configured as a delta configuration with respect to a reference SCell configuration also associated with SCell index “5,” a candidate SCell associated with SCell index “7” may be configured as a delta configuration with respect to a reference SCell configuration also associated with SCell index "7," and so forth.

In some other aspects, a candidate cell group configuration (e.g., a CellGroupConfig IE) may be associated with a candidate SpCell configuration and/or one or more candidate SCell configurations that are configured as delta configurations with respect to any of the reference cell configurations. More particularly, a candidate SpCell configuration may be configured as a delta configuration with respect to any of the reference SpCell configuration or the one or more reference SCell configurations. Similarly, each candidate SCell configuration, of the one or more candidate SCell configurations, may be configured as a delta configuration with respect to any of the reference SpCell configuration or the one or more reference SCell configurations.

In some other aspects, the reference LTM configuration may include one or more reference SpCell configurations (e.g., the reference LTM configuration may, in some examples, include multiple SpCell configurations), optionally, one or more reference SCell configurations (e.g., the reference LTM configuration may include one or more reference SCell configurations when one or more candidate SCells are being configured). In such aspects, a candidate cell group configuration (e.g., a CellGroupConfig IE) may be associated with a candidate SpCell configuration that is configured as a delta configuration with respect to a reference SpCell configuration, of the one or more reference SpCell configurations. In that regard, the candidate SpCell configuration may include an indication of an associated reference SpCell configuration. For example, the candidate SpCell configuration may indicate an index associated with a reference SpCell configuration for which the delta configuration corresponds. Moreover, in aspects in which one or more candidate SCells are configured, a candidate cell group configuration may be associated with one or more candidate SCell configurations, with each of the one or more candidate SCell configurations being configured as a delta configuration with respect to a reference SCell configuration and/or an SpCell configuration (e.g., the candidate SCell configuration may be configured as a delta configuration with respect to a single indicated reference SCell configuration, with respect to a reference SCell configuration associated with a same respective SCell index as the candidate SCell configuration, with respect to any of the one or more reference SpCell configurations or the one or more reference SCell configurations, or the like).

In some aspects, delta signaling may not be used for one or more cells within a cell group configuration (e.g., a CellGroupConfig IE). For example, in aspects in which a particular candidate cell configuration varies significantly from the reference cell configurations, the candidate cell configuration may include a full candidate SpCell configuration and/or a full candidate SCell configuration (e.g., a standalone configuration that is not indicated as a delta with respect to a base, or reference, configuration). In that regard, in some aspects, the candidate cell group configuration may indicate whether delta configurations are being provided and/or whether full configurations are being provided. Additionally, or alternatively, in aspects in which multiple reference cells are configured by the reference LTM configuration (e.g., one or more reference SpCells and/or one or more SCells), a candidate cell configuration may include an indication of which reference cell a particular delta configuration applies to. For example, each reference cell configuration may be associated with a cell index, and each candidate cell configuration (e.g., each delta configuration) may indicate the index of the reference cell configuration for which the delta configuration is associated with.

In some aspects, the configuration information described above in connection with reference number 705 may include multiple reference LTM configurations. That is, the network node 110 may transmit, and the UE 120 may receive, multiple reference LTM configurations. In such aspects, the network node 110 may indicate which reference LTM configuration is used for a particular delta configuration. More particularly, the network node 110 may transmit, and the UE 120 may receive, an indication of a reference LTM configuration that was selected from multiple reference LTM configurations for preparing the one or more delta configurations (e.g., an indication of a reference LTM configuration that should be used when configuring the UE 120 with a candidate cell group configuration associated with delta configurations).

The UE 120 may configure itself based at least in part on the configuration information. In some aspects, the UE 120 may be configured to perform one or more operations described herein based at least in part on the configuration information.

As shown by reference number 715, the UE may transmit, and the network node 110 may receive, an L1 measurement report (e.g., the L1 measurement report described above in connection with reference number 435). In some aspects, the L1 measurement report may indicate signal strength measurements (e.g., RSRP, RSSI, RSRQ, and/or CQI) or similar measurements associated with the one or more candidate cell group configurations. As shown by reference number 720, based at least in part on the L1 measurement report, the network node 110 may make an LTM decision. Put another way, based at least in part on the L1 measurement report, the network node 110 may decide to execute an LTM cell switch to a candidate cell. Accordingly, as shown by reference number 725, the network node 110 may transmit, and the UE 120 may receive, a MAC-CE or similar message triggering an LTM cell switch (e.g., the network may transmit a cell switch command triggering an LTM procedure). The cell switch command may include an indication of a candidate configuration index associated with the target cell. As shown by reference number 730, based at least in part on receiving the cell switch command, the UE 120 may perform an LTM procedure associated with a selected candidate cell group configuration (e.g., a candidate cell group configuration indicated by the cell switch command).

Based at least in part on configuring the UE 120 using delta configurations with respect to a dedicated and/or separate reference configuration associated with one or more reference SpCells and zero or more reference SCells, the UE 120 and/or the network node 110 may conserve computing, power, network, and/or communication resources that may have otherwise been consumed traditional LTM procedures. For example, based at least in part on configuring the UE 120 using delta configurations with respect to a dedicated and/or separate reference configuration associated with one or more reference SpCells and zero or more reference SCells, the UE 120 and the network node 110 may perform sequential LTM procedures without requiring intermediate RRC reconfiguration and with a reduced error rate, which may conserve computing, power, network, and/or communication resources that may have otherwise been consumed to transmit RRC signals and/or detect and/or correct communication errors.

As indicated above, FIG. 7 is provided as an example. Other examples may differ from what is described with respect to FIG. 7.

Figure 8A:
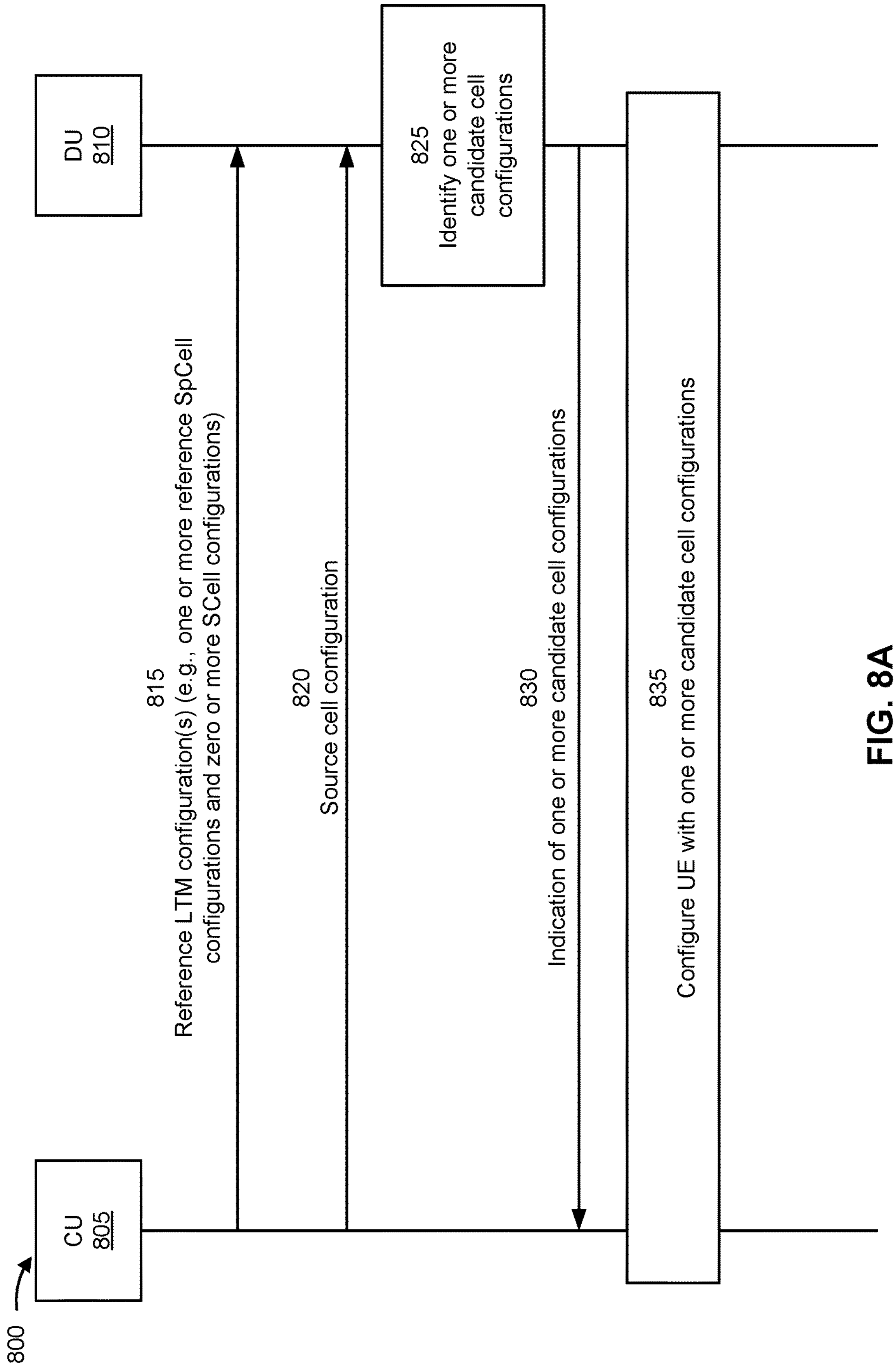
FIGS. 8A-8B are diagrams of an example associated with delta configurations for LTM, in accordance with the present disclosure.
Figure 8B:
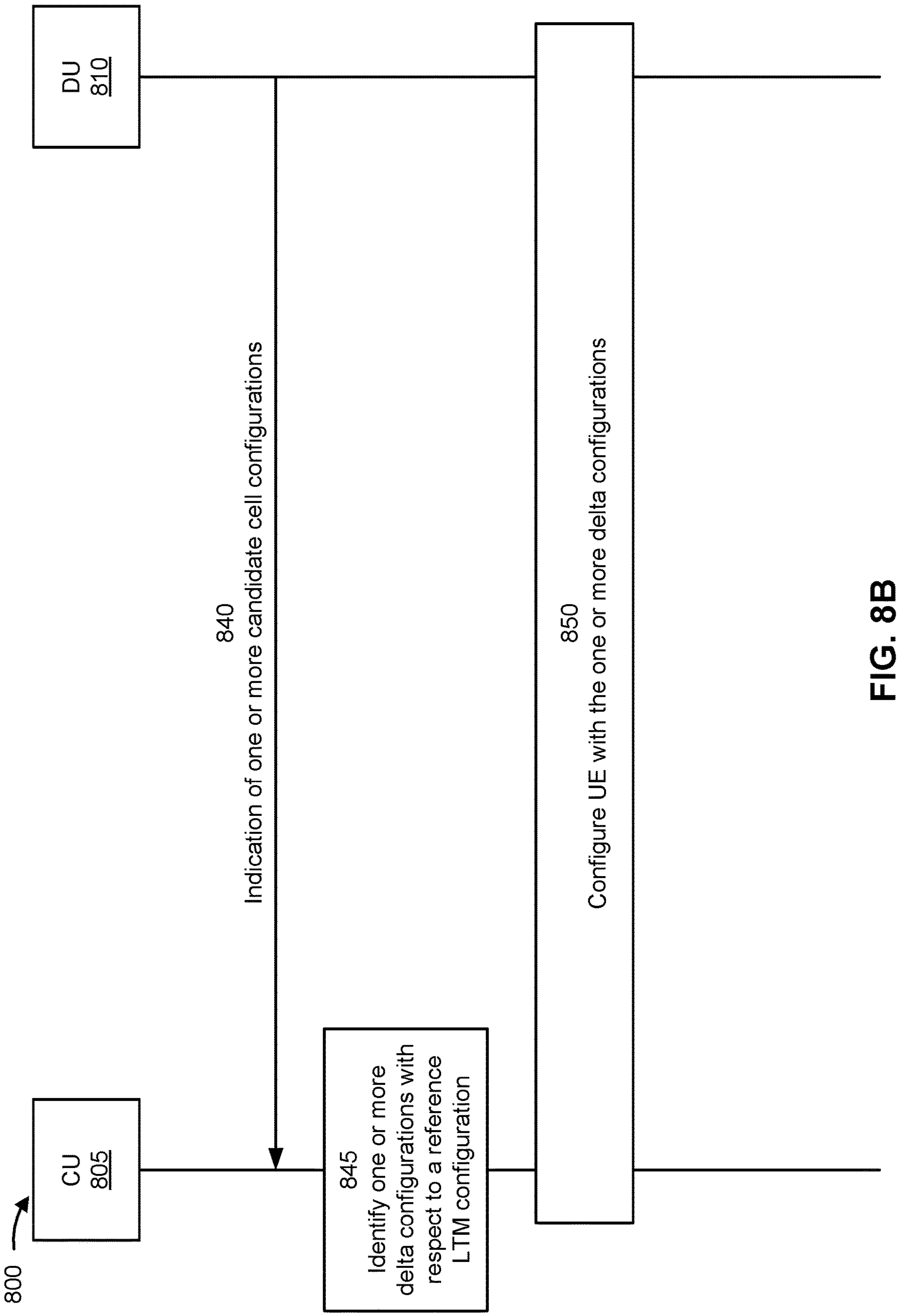

FIGS. 8A-8B are diagrams of an example 800 associated with delta configurations for LTM, in accordance with the present disclosure. As shown in FIGS. 8A-8B, a first network node (e.g., a CU 805) may communicate with a second network node (e.g., a DU 810). In some aspects, the CU 805 and the DU 810 may be part of a wireless network (e.g., wireless network 100). The CU 805 and/or the DU 810 may be capable of communicating with other network devices, such as a UE 120. For example, The CU 805, the DU 810, and/or a UE 120 may have established a wireless connection prior to operations shown in FIGS. 8A-8B. In some aspects, the CU 805 and/or the DU 810 may correspond to the network node 110 described above in connection with FIG. 7. Additionally, or alternatively, in some aspects, the CU 805 and/or the DU 810 may be associated with a candidate and/or target cell of a mobility procedure (e.g., an LTM procedure), and/or a candidate and/or target cell group of a mobility procedure.

In some aspects, the CU 805 and the DU 810 may cooperatively determine one or more candidate cell group configurations, such as one or more of the example candidate cell group configurations described above in connection with reference number 710. For example, as shown in FIG. 8A, in some aspects the DU 810 may determine delta configurations with respect to a reference LTM configuration, such as the example reference LTM configuration described above in connection with reference number 705. More particularly, as shown by reference number 815, the CU 805 may transmit, and the DU 810 may receive, an indication of one or more reference LTM configurations. In a similar manner as described above in connection with reference number 705, in some aspects the reference LTM configuration may be associated with one or more reference cell configurations. For example, the reference LTM configuration may be associated with one or more reference SpCell configurations and zero or more reference SCell configurations, as described above in connection with FIG. 7.

In some aspects, the CU 805 may transmit the one or more reference LTM configurations based at least in part on the CU 805 performing an LTM decision. For example, a UE 120 may provide to the CU 805, via a source DU, L3 measurement reports. Based at least in part on the L3 measurement reports, the CU 805 may determine that the UE 120 should be configured for LTM. In that regard, based at least in part on the LTM decision, the CU 805 may transmit the communication shown in connection with reference number 815 (e.g., the indication of the one or more reference LTM configurations). In some aspects, the communication shown in connection with reference number 815 may be transmitted as part of a UE context setup or modification request communication.

As shown by reference number 820, the CU 805 may transmit, and the DU 810 may receive, an indication of a source cell information associated with a source cell of UE 120. For example, the CU 805 may provide an indication of one or more source cells associated with the UE 120, an indication of a cell group configuration (e.g., CellGroupConfig IE) associated with the one or more source cells associated with the UE 120, and/or an indication of the source RRC configuration. In some aspects, the communication shown in connection with reference number 820 may be transmitted as part of a UE context setup or modification request communication.

As shown by reference number 825, the DU 810 may identify, based at least in part on the reference LTM configuration, one or more candidate cell configurations associated with one or more candidate cells for an LTM procedure. In aspects in which the UE 120's source cell information is provided to the DU 810 (as described above in connection with reference number 820), the DU 810 may further identify the one or more candidate cell configurations based at least in part on the source cell information. In some aspects, the one or more candidate cell configurations may be associated with a candidate cell group configuration (e.g., a CellGroupConfig IE), as described above in connection with reference number 710.

Additionally, or alternatively, the one or more candidate cell configurations may be associated with one or more delta configurations. For example, the one or more candidate cell configurations may be indicated as delta configurations with respect to one or more reference cell configurations associated with the reference LTM configuration, as described above in connection with reference number 710. In some other aspects, one or more of the candidate cell configurations may be associated with full configurations, such as when the one or more candidate cell configurations substantially differ from the reference LTM configuration.

As shown by reference number 830, the DU 810 may transmit, and the CU 805 may receive, an indication of the one or more candidate cell configurations. For example, the DU 810 may transmit an indication of one or more CellGroupConfig IEs for one or more candidate cell groups, each of the one or more CellGroupConfig IEs indicating a delta configuration with respect to a reference LTM configuration for one or more candidate cells and/or a full configuration for one or more candidate cells. In aspects in which the one or more candidate cell configurations include delta signaling, the DU 810 may indicate, to the CU 805, that the one more delta configurations are being used. For example, the DU 810 may transmit, to the CU 805 (e.g., as part of the one or more candidate cell configurations), an indication that the one or more candidate cell configurations are associated with the one or more delta configurations. Similarly, in aspects in which the one or more candidate cell configurations are associated with full configurations (e.g., are not associated with delta signaling), the DU 810 may indicate, to the CU 805, that the one or more full configurations are being used. For example, the DU 810 may transmit, to the CU 805 (e.g., as part of the one or more candidate cell configurations), an indication that the one or more candidate cell configurations are associated with the one or more full configurations.

In some aspects, in connection with the operations described above in connection with reference number 815, the CU 805 may transmit, and the DU 810 may receive, multiple reference LTM configurations. In such aspects, the DU 810 may indicate, to the CU 805, a particular reference LTM configuration used to generate a candidate cell configuration and/or a candidate cell group configuration using delta signaling. For example, the DU 810 may select one of the multiple reference LTM configurations for preparing the delta configurations, and the DU 810 may transmit, and the CU 805 may receive, an indication of the selected LTM configuration, of the multiple reference LTM configurations. In some aspects, the communication shown in connection with reference number 830 may be transmitted as part of a UE context setup or modification response communication.

As indicated by reference number 835, based at least in part on the one or more candidate cell configurations, the CU 805, the DU 810, and/or another network node (e.g., a source DU) may configure a UE 120 for LTM (e.g., the CU 805, the DU 810, and/or a source DU may transmit, to a UE 120, an indication of the one or more candidate cell configurations, which may include one or more delta configurations and/or one or more full configurations). For example, CU 805 may transmit the one or more candidate cell configurations to a source DU via a downlink message transfer communication. The source DU may in turn configure the UE 120 with one or more candidate cell configurations via an RRC reconfiguration communication, similar to the communications described above in connection with reference numbers 420, 705, and/or 710. In some aspects, the source DU and a candidate and/or target DU may be the same DU (e.g., the source DU may also be associated with one or more candidate and/or target cells), while, in some other aspects, the source DU may differ from a candidate and/or target DU.

As shown in FIG. 8B, in some aspects the CU 805 may determine delta configurations with respect to a reference LTM configuration, such as the example reference LTM configuration described above in connection with reference number 705. More particularly, as shown by reference number 840, the DU 810 may transmit, and the CU 805 may receive, an indication of one or more candidate cell configurations associated with one or more candidate cells for an LTM procedure. In a similar manner as described above in connection with FIG. 8A, the one or more candidate cell configurations may be transmitted as part of a UE context setup or modification response communication. Additionally, or alternatively, in some aspects, the one or more candidate cell configurations may be associated with a candidate cell group configuration (e.g., a CellGroupConfig IE). In some aspects, the one or more candidate cell group configurations may be full configurations. Put another way, the CU 805 may not indicate the one or more reference LTM configurations to the DU 810 prior to the DU 810 preparing the one or more candidate cell configurations and/or the DU 810 may otherwise be unaware of the one or more reference LTM configurations. Moreover, in some aspects, the CU 805 may request the DU 810 to provide the one or more candidate cell configurations or candidate cell group configurations using a full configuration. In that regard, the CU 805 may transmit (e.g., as part of a UE context setup request communication), and the DU 810 may receive, an indication that the one or more candidate cell configurations are to be provided as full configurations. In such aspects, in connection with the message shown by reference number 840, the DU 810 may transmit, and the CU 805 may receive, one or more full configurations for the one or more candidate cells based at least in part on the indication that the one or more candidate cell configurations are to be provided as full configurations.

As shown by reference number 845, the CU 805 may identify, based at least in part on the one or more candidate cell configurations received from the DU 810 (e.g., the one or more full configurations received from the DU 810) and a reference LTM configuration, one or more delta configurations with respect to the reference LTM configuration for the one or more candidate cells. In some aspects, the one or more candidate cell configurations may be associated with a candidate cell group configuration (e.g., a CellGroupConfig IE), as described above in connection with reference number 710.

As shown by reference number 850, the CU 805, the DU 810, and/or another network node (e.g., a source DU) may configure a UE 120 for LTM (e.g., the CU 805, the DU 810, and/or a source DU may transmit, to a UE 120, an indication of the one or more candidate cell configurations, which may include one or more delta configurations and/or one or more full configurations). For example, CU 805 may transmit the one or more candidate cell configurations to a source DU via a downlink message transfer communication in a similar manner as described above in connection with reference number 835. The source DU may in turn configure the UE 120 with one or more candidate cell configurations via an RRC reconfiguration communication, similar to the communications described above in connection with reference number 420, 705, and/or 710.

As indicated above, FIGS. 8A-8B are provided as an example. Other examples may differ from what is described with respect to FIGS. 8A-8B.

Figure 9:
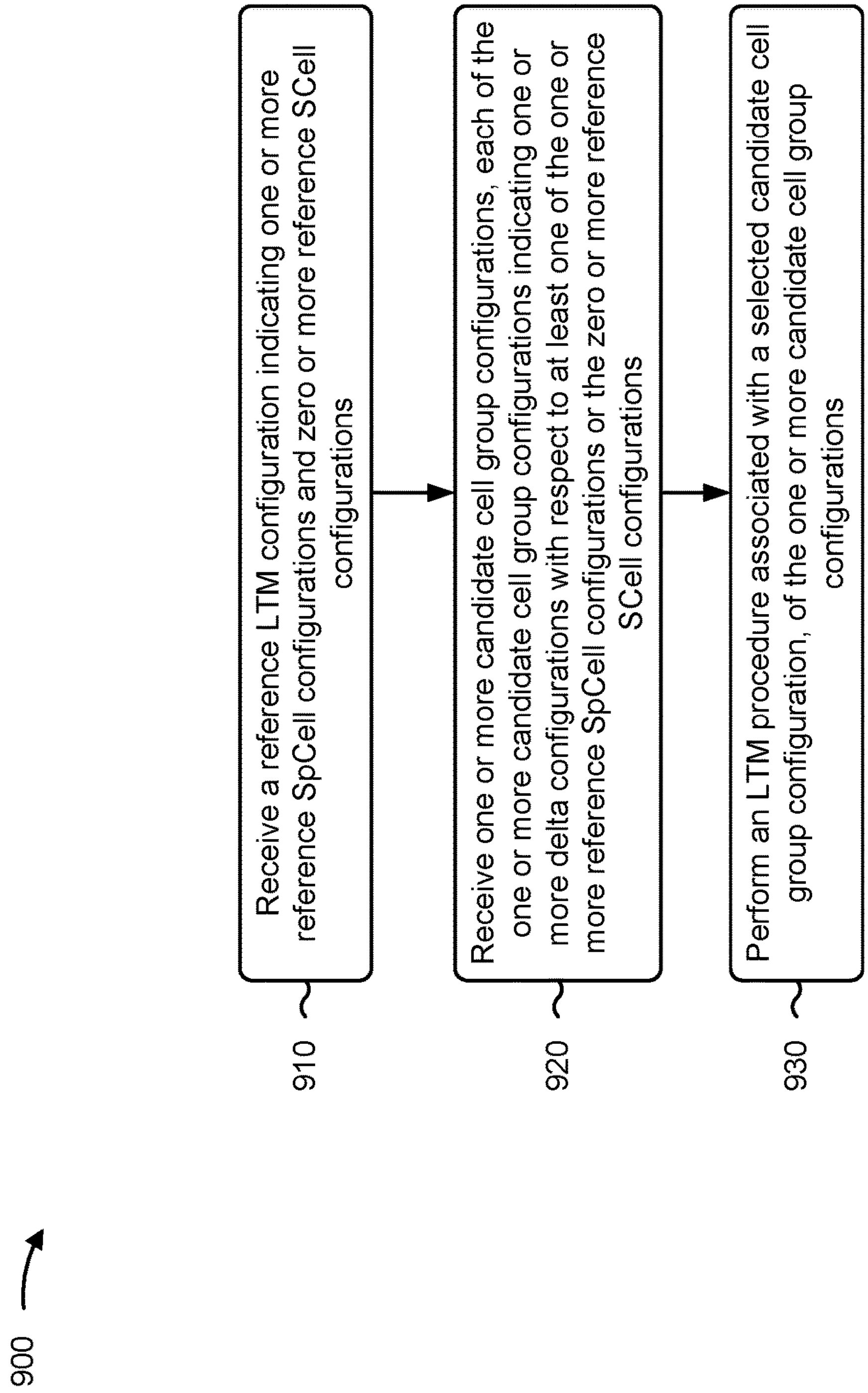
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with delta configuration for LTM.

As shown in FIG. 9, in some aspects, process 900 may include receiving a reference LTM configuration indicating one or more reference SpCell configurations and zero or more reference SCell configurations (block 910). For example, the UE (e.g., using reception component 1402 and/or communication manager 1406, depicted in FIG. 14) may receive a reference LTM configuration indicating one or more reference SpCell configurations and zero or more reference SCell configurations, as described above.

As further shown in FIG. 9, in some aspects, process 900 may include receiving one or more candidate cell group configurations, each of the one or more candidate cell group configurations indicating one or more delta configurations with respect to at least one of the one or more reference SpCell configurations or the zero or more reference SCell configurations (block 920). For example, the UE (e.g., using reception component 1402 and/or communication manager 1406, depicted in FIG. 14) may receive one or more candidate cell group configurations, each of the one or more candidate cell group configurations indicating one or more delta configurations with respect to at least one of the one or more reference SpCell configurations or the zero or more reference SCell configurations, as described above.

As further shown in FIG. 9, in some aspects, process 900 may include performing an LTM procedure associated with a selected candidate cell group configuration, of the one or more candidate cell group configurations (block 930). For example, the UE (e.g., using communication manager 1406, depicted in FIG. 14) may perform an LTM procedure associated with a selected candidate cell group configuration, of the one or more candidate cell group configurations, as described above.

Process 900 may include additional aspects, such as any single aspect or any combination of aspects described below and/or in connection with one or more other processes described elsewhere herein.

In a first aspect, the selected candidate cell group configuration is associated with a candidate SpCell configuration, and the candidate SpCell configuration is indicated as a delta configuration with respect to a reference SpCell configuration, of the one or more reference SpCell configurations.

In a second aspect, alone or in combination with the first aspect, the reference LTM configuration indicates a reference SCell configuration, the selected candidate cell group configuration indicates a candidate SCell configuration, and the candidate SCell configuration is indicated as a delta configuration with respect to the reference SCell configuration.

In a third aspect, alone or in combination with one or more of the first and second aspects, the reference LTM configuration indicates one or more reference SCell configurations, each associated with a respective SCell index, the selected candidate cell group configuration indicates one or more candidate SCell configurations, each associated with a respective SCell index, and each candidate SCell configuration, of the one or more candidate SCell configurations, is indicated as a delta configuration with respect to a reference SCell configuration associated with a same respective SCell index as the candidate SCell configuration.

In a fourth aspect, alone or in combination with one or more of the first through third aspects, the reference LTM configuration indicates one or more reference SCell configurations, the selected candidate cell group configuration indicates a candidate SpCell configuration, and the candidate SpCell configuration is indicated as a delta configuration with respect to a reference SCell configuration, of the one or more reference SCell configurations.

In a fifth aspect, alone or in combination with one or more of the first through fourth aspects, the selected candidate cell group configuration indicates one or more candidate SCell configurations, and each candidate SCell configuration, of the one or more candidate SCell configurations, is indicated as a delta configuration with respect to a reference SpCell configuration, of the one or more reference SpCell configurations.

In a sixth aspect, alone or in combination with one or more of the first through fifth aspects, the selected candidate cell group configuration indicates a candidate SpCell configuration, and the candidate SpCell configuration is indicated as a delta configuration with respect to a reference SpCell configuration, of the one or more SpCell configurations, that is indicated by the candidate SpCell configuration.

In a seventh aspect, alone or in combination with one or more of the first through sixth aspects, at least one candidate cell group configuration, of the one or more candidate cell group configurations, includes at least one of a full candidate SpCell configuration or a full candidate SCell configuration.

In an eighth aspect, alone or in combination with one or more of the first through seventh aspects, at least one candidate cell group configuration, of the one or more candidate cell group configurations, includes an indication that the at least one of the one or more reference SpCell configurations or the zero or more reference SCell configurations are associated with the one or more delta configurations.

In a ninth aspect, alone or in combination with one or more of the first through eighth aspects, process 900 includes receiving an indication of multiple reference LTM configurations, wherein the reference LTM configuration is a selected one of the multiple reference LTM configurations, and receiving an indication that the reference LTM configuration was selected from multiple reference LTM configurations for preparing the one or more delta configurations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
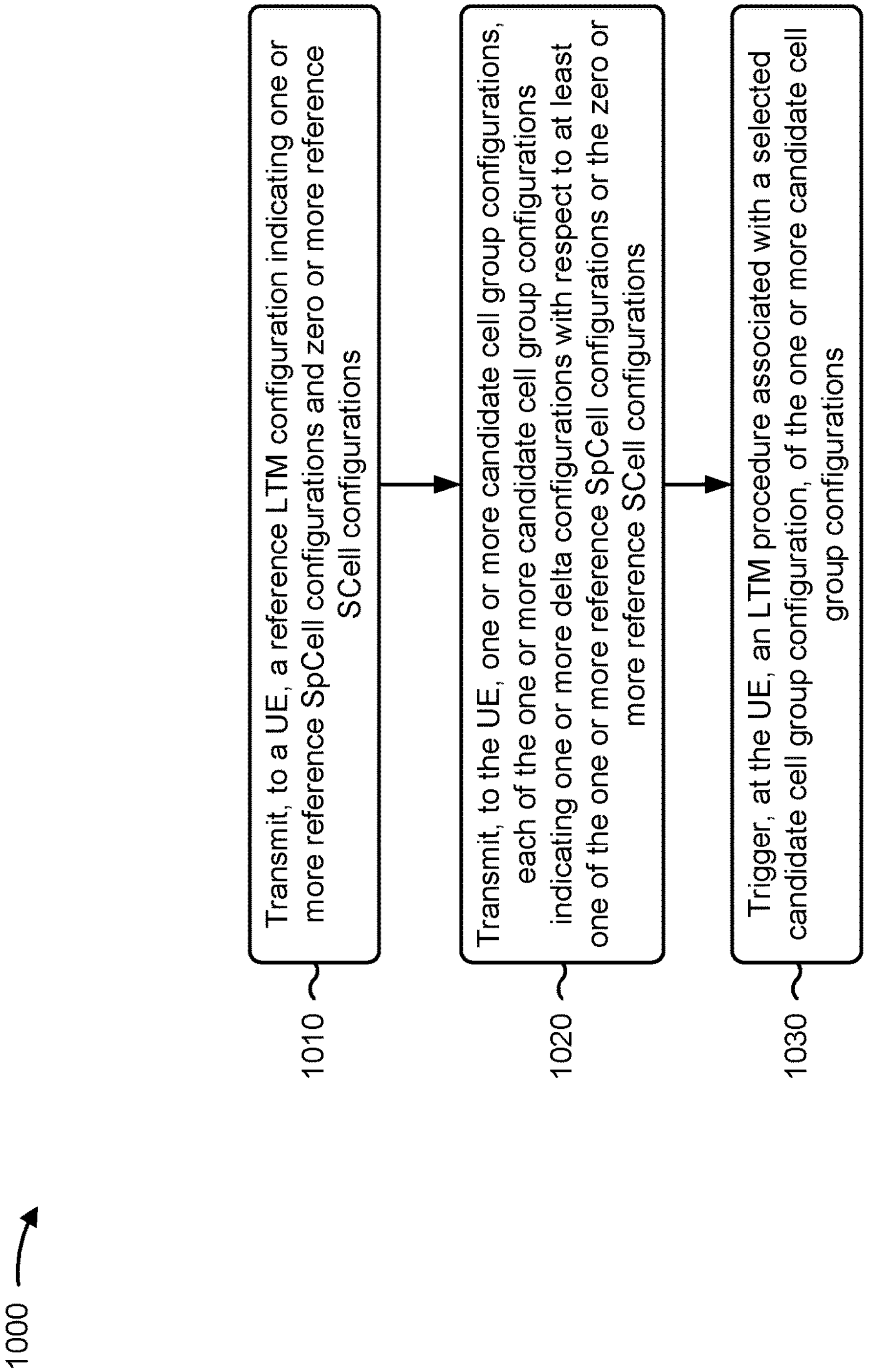
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with delta configuration for LTM.

As shown in FIG. 10, in some aspects, process 1000 may include transmitting, to a UE, a reference LTM configuration indicating one or more reference SpCell configurations and zero or more reference SCell configurations (block 1010). For example, the network node (e.g., using transmission component 1504 and/or communication manager 1506, depicted in FIG. 15) may transmit, to a UE, a reference LTM configuration indicating one or more reference SpCell configurations and zero or more reference SCell configurations, as described above.

As further shown in FIG. 10, in some aspects, process 1000 may include transmitting, to the UE, one or more candidate cell group configurations, each of the one or more candidate cell group configurations indicating one or more delta configurations with respect to at least one of the one or more reference SpCell configurations or the zero or more reference SCell configurations (block 1020). For example, the network node (e.g., using transmission component 1504 and/or communication manager 1506, depicted in FIG. 15) may transmit, to the UE, one or more candidate cell group configurations, each of the one or more candidate cell group configurations indicating one or more delta configurations with respect to at least one of the one or more reference SpCell configurations or the zero or more reference SCell configurations, as described above.

As further shown in FIG. 10, in some aspects, process 1000 may include triggering, at the UE, an LTM procedure associated with a selected candidate cell group configuration, of the one or more candidate cell group configurations (block 1030). For example, the network node (e.g., using communication manager 1506, depicted in FIG. 15) may trigger, at the UE, an LTM procedure associated with a selected candidate cell group configuration, of the one or more candidate cell group configurations, as described above.

Process 1000 may include additional aspects, such as any single aspect or any combination of aspects described below and/or in connection with one or more other processes described elsewhere herein.

In a first aspect, the selected candidate cell group configuration is associated with a candidate SpCell configuration, and the candidate SpCell configuration is indicated as a delta configuration with respect to a reference SpCell configuration, of the one or more reference SpCell configurations.

In a second aspect, alone or in combination with the first aspect, the reference LTM configuration indicates a reference SCell configuration, the selected candidate cell group configuration indicates a candidate SCell configuration, and the candidate SCell configuration is indicated as a delta configuration with respect to the reference SCell configuration.

In a third aspect, alone or in combination with one or more of the first and second aspects, the reference LTM configuration indicates one or more reference SCell configurations, each associated with a respective SCell index, the selected candidate cell group configuration indicates one or more candidate SCell configurations, each associated with a respective SCell index, and each candidate SCell configuration, of the one or more candidate SCell configurations, is indicated as a delta configuration with respect to a reference SCell configuration associated with a same respective SCell index as the candidate SCell configuration.

In a fourth aspect, alone or in combination with one or more of the first through third aspects, the reference LTM configuration indicates one or more reference SCell configurations, the selected candidate cell group configuration indicates a candidate SpCell configuration, and the candidate SpCell configuration is indicated as a delta configuration with respect to a reference SCell configuration, of the one or more reference SCell configurations.

In a fifth aspect, alone or in combination with one or more of the first through fourth aspects, the selected candidate cell group configuration indicates one or more candidate SCell configurations, and each candidate SCell configuration, of the one or more candidate SCell configurations, is indicated as a delta configuration with respect to a reference SpCell configuration, of the one or more reference SpCell configurations.

In a sixth aspect, alone or in combination with one or more of the first through fifth aspects, the selected candidate cell group configuration indicates a candidate SpCell configuration, and the candidate SpCell configuration is indicated as a delta configuration with respect to a reference SpCell configuration, of the one or more SpCell configurations, that is indicated by the candidate SpCell configuration.

In a seventh aspect, alone or in combination with one or more of the first through sixth aspects, at least one candidate cell group configuration, of the one or more candidate cell group configurations, includes at least one of a full candidate SpCell configuration or a full candidate SCell configuration.

In an eighth aspect, alone or in combination with one or more of the first through seventh aspects, at least one candidate cell group configuration, of the one or more candidate cell group configurations, includes an indication that the at least one of the one or more reference SpCell configurations or the zero or more reference SCell configurations are associated with the one or more delta configurations.

In a ninth aspect, alone or in combination with one or more of the first through eighth aspects, process 1000 includes transmitting, to the UE, an indication of multiple reference LTM configurations, wherein the reference LTM configuration is a selected one of the multiple reference LTM configurations, and transmitting, to the UE, an indication that the reference LTM configuration was selected from multiple reference LTM configurations for preparing the one or more delta configurations.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
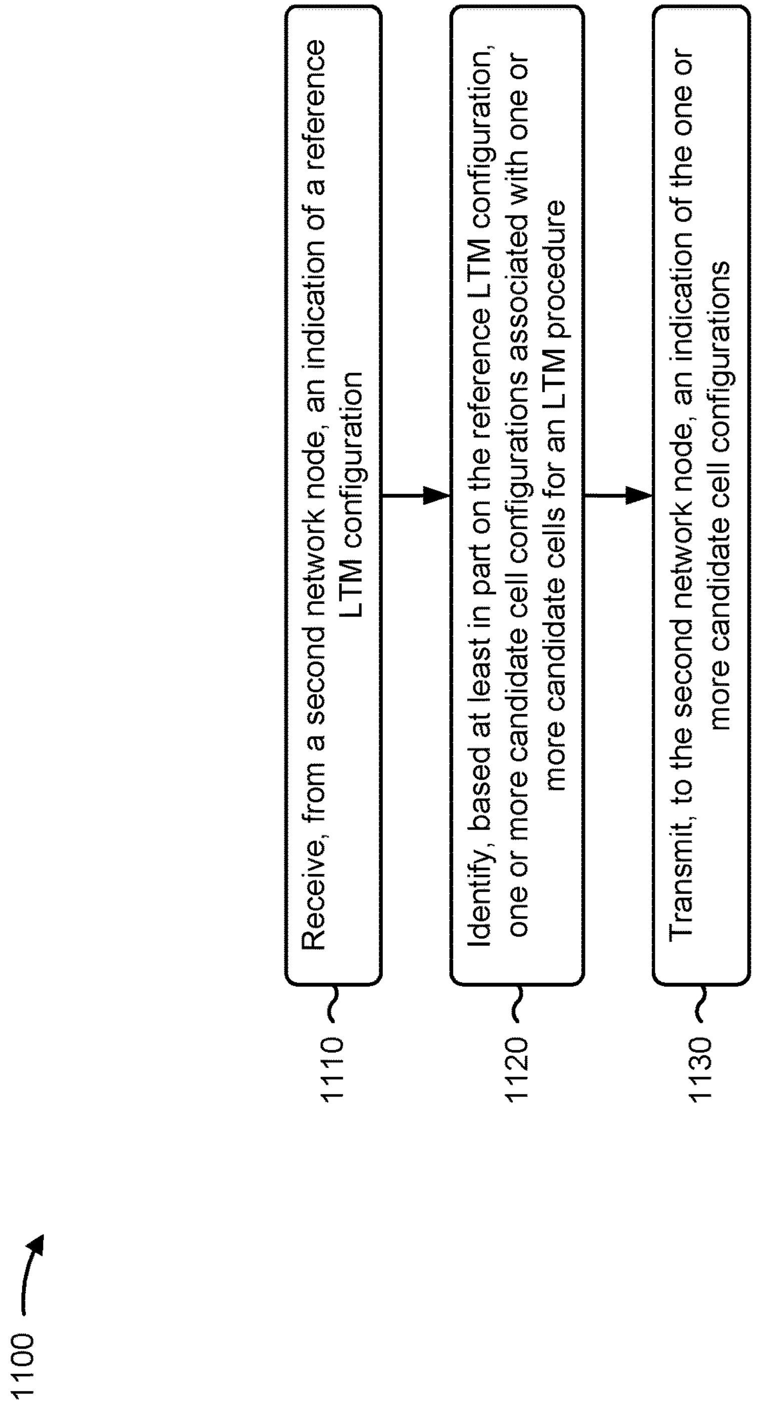
FIG. 11 is a diagram illustrating an example process performed, for example, by a first network node, in accordance with the present disclosure.

FIG. 11 is a diagram illustrating an example process 1100 performed, for example, by a first network node, in accordance with the present disclosure. Example process 1100 is an example where the first network node (e.g., network node 110) performs operations associated with delta configuration for LTM.

As shown in FIG. 11, in some aspects, process 1100 may include receiving, from a second network node, an indication of a reference LTM configuration (block 1110). For example, the first network node (e.g., using reception component 1502 and/or communication manager 1506, depicted in FIG. 15) may receive, from a second network node, an indication of a reference LTM configuration, as described above.

As further shown in FIG. 11, in some aspects, process 1100 may include identifying, based at least in part on the reference LTM configuration, one or more candidate cell configurations associated with one or more candidate cells for an LTM procedure (block 1120). For example, the first network node (e.g., using communication manager 1506, depicted in FIG. 15) may identify, based at least in part on the reference LTM configuration, one or more candidate cell configurations associated with one or more candidate cells for an LTM procedure, as described above.

As further shown in FIG. 11, in some aspects, process 1100 may include transmitting, to the second network node, an indication of the one or more candidate cell configurations (block 1130). For example, the first network node (e.g., using transmission component 1504 and/or communication manager 1506, depicted in FIG. 15) may transmit, to the second network node, an indication of the one or more candidate cell configurations, as described above.

Process 1100 may include additional aspects, such as any single aspect or any combination of aspects described below and/or in connection with one or more other processes described elsewhere herein.

In a first aspect, the first network node is a distributed unit of a network entity, and the second network node is a centralized unit of a network entity.

In a second aspect, alone or in combination with the first aspect, process 1100 includes receiving, from the second network node, an indication of source cell information associated with a source cell of a UE, wherein identifying the one or more candidate cell configurations is further based at least in part on the source cell information.

In a third aspect, alone or in combination with one or more of the first and second aspects, the one or more candidate cell configurations are associated with a candidate cell group configuration.

In a fourth aspect, alone or in combination with one or more of the first through third aspects, the one or more candidate cell configurations are associated with one or more delta configurations with respect to the reference LTM configuration.

In a fifth aspect, alone or in combination with one or more of the first through fourth aspects, process 1100 includes transmitting, to the second network node, an indication that the one or more candidate cell configurations are associated with the one or more delta configurations.

In a sixth aspect, alone or in combination with one or more of the first through fifth aspects, process 1100 includes receiving, from the second network node, an indication of multiple reference LTM configurations, wherein the reference LTM configuration is a selected one of the multiple reference LTM configurations, and transmitting, to the second network node, an indication that the reference LTM configuration was selected from the multiple reference LTM configurations for preparing the one or more delta configurations.

In a seventh aspect, alone or in combination with one or more of the first through sixth aspects, the one or more candidate cell configurations are associated with one or more full configurations.

In an eighth aspect, alone or in combination with one or more of the first through seventh aspects, process 1100 includes transmitting, to the second network node, an indication that the one or more candidate cell configurations are associated with the one or more full configurations.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
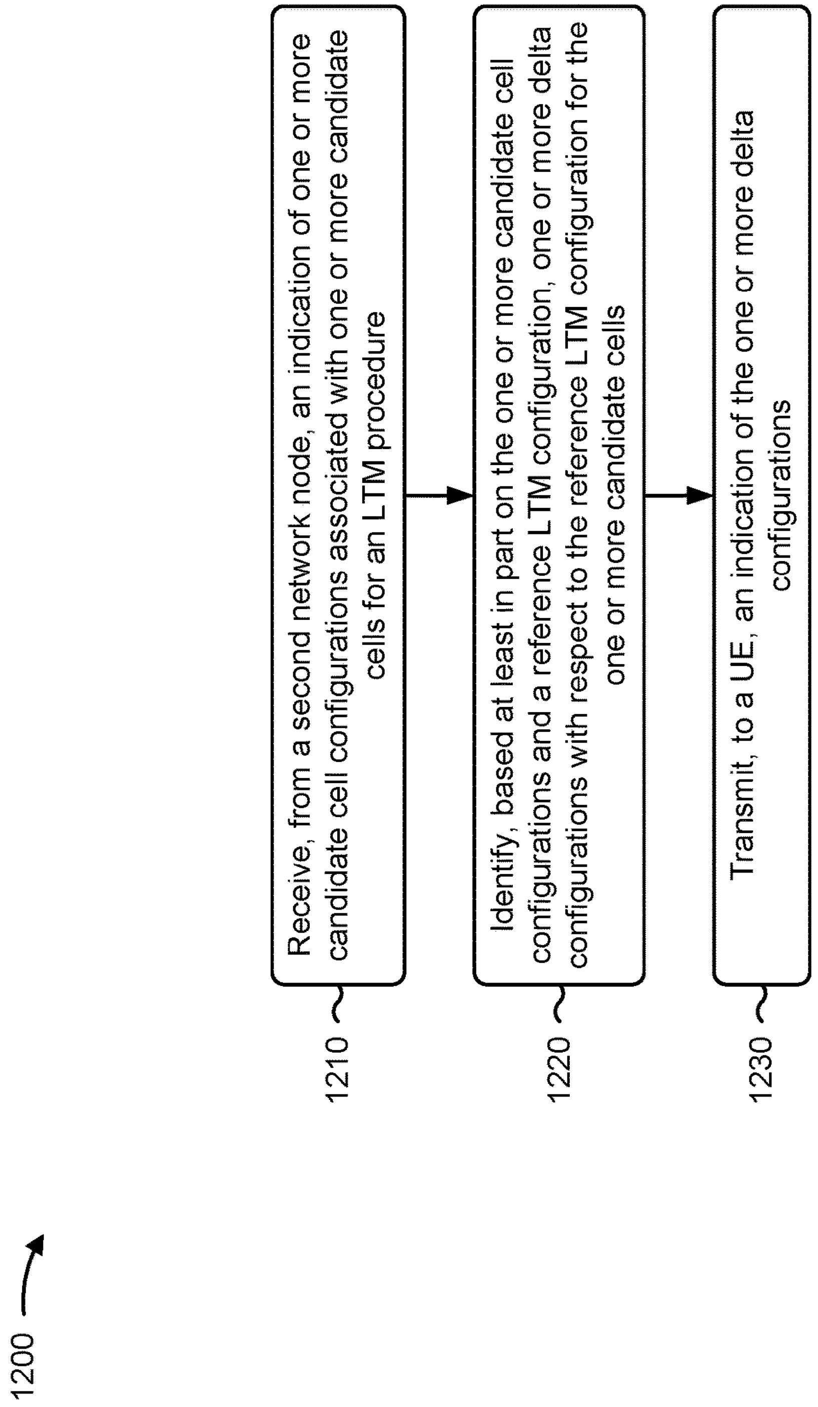
FIG. 12 is a diagram illustrating an example process performed, for example, by a first network node, in accordance with the present disclosure.

FIG. 12 is a diagram illustrating an example process 1200 performed, for example, by a first network node, in accordance with the present disclosure. Example process 1200 is an example where the first network node (e.g., network node 110) performs operations associated with delta configuration for LTM.

As shown in FIG. 12, in some aspects, process 1200 may include receiving, from a second network node, an indication of one or more candidate cell configurations associated with one or more candidate cells for an LTM procedure (block 1210). For example, the first network node (e.g., using reception component 1502 and/or communication manager 1506, depicted in FIG. 15) may receive, from a second network node, an indication of one or more candidate cell configurations associated with one or more candidate cells for an LTM procedure, as described above.

As further shown in FIG. 12, in some aspects, process 1200 may include identifying, based at least in part on the one or more candidate cell configurations and a reference LTM configuration, one or more delta configurations with respect to the reference LTM configuration for the one or more candidate cells (block 1220). For example, the first network node (e.g., using communication manager 1506, depicted in FIG. 15) may identify, based at least in part on the one or more candidate cell configurations and a reference LTM configuration, one or more delta configurations with respect to the reference LTM configuration for the one or more candidate cells, as described above.

As further shown in FIG. 12, in some aspects, process 1200 may include transmitting, to a UE, an indication of the one or more delta configurations (block 1230). For example, the first network node (e.g., using transmission component 1504 and/or communication manager 1506, depicted in FIG. 15) may transmit, to a UE, an indication of the one or more delta configurations, as described above.

Process 1200 may include additional aspects, such as any single aspect or any combination of aspects described below and/or in connection with one or more other processes described elsewhere herein.

In a first aspect, the first network node is a centralized unit of a network entity, and the second network node is a distributed unit of a network entity.

In a second aspect, alone or in combination with the first aspect, the one or more candidate cell configurations are associated with a candidate cell group configuration.

In a third aspect, alone or in combination with one or more of the first and second aspects, the one or more delta configurations are associated with a candidate cell group configuration.

In a fourth aspect, alone or in combination with one or more of the first through third aspects, process 1200 includes transmitting, to the second network node, an indication that the one or more candidate cell configurations are to be provided as full configurations, and receiving, from the second network node and based at least in part on the indication that the one or more candidate cell configurations are to be provided as full configurations, one or more full configurations for the one or more candidate cells.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
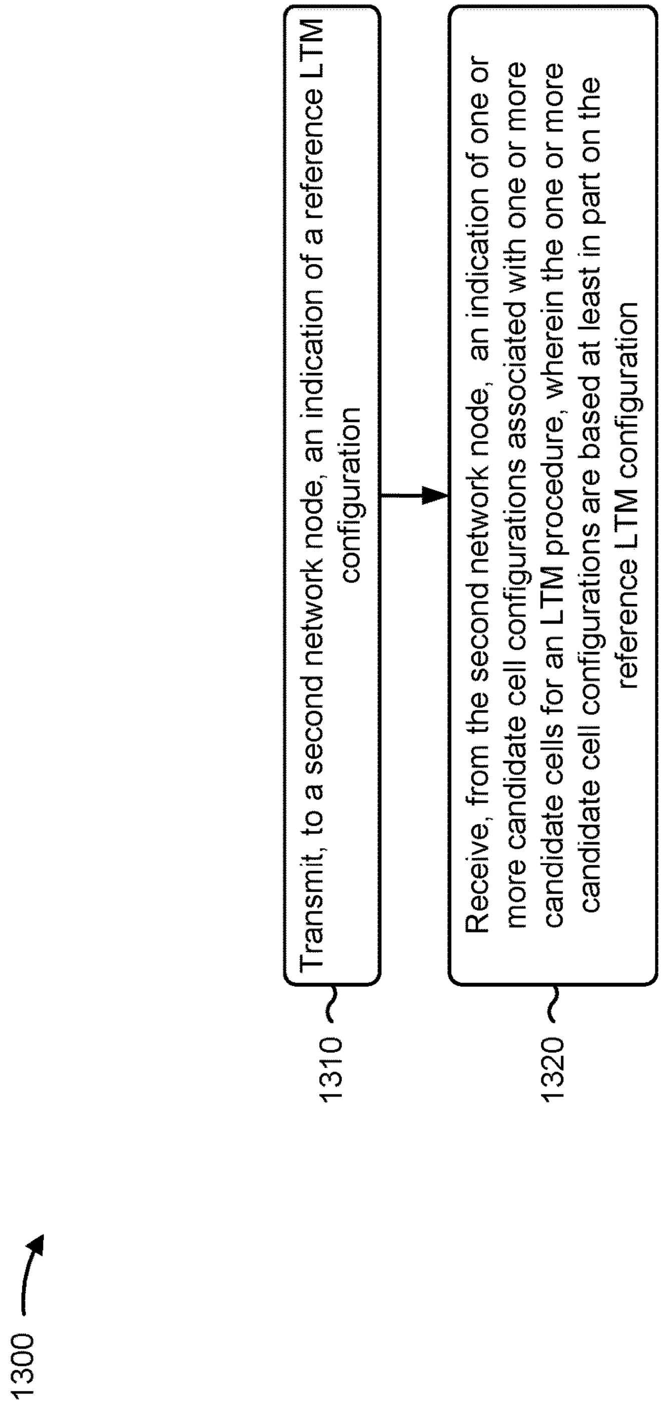
FIG. 13 is a diagram illustrating an example process performed, for example, by a first network node, in accordance with the present disclosure

FIG. 13 is a diagram illustrating an example process 1300 performed, for example, at a first network node or an apparatus of a first network node, in accordance with the present disclosure. Example process 1300 is an example where the apparatus or the first network node (e.g., network node 110 and/or CU 805) performs operations associated with delta configurations for layer 1/layer 2 triggered mobility.

As shown in FIG. 13, in some aspects, process 1300 may include transmitting, to a second network node, an indication of a reference LTM configuration (block 1310). For example, the first network node (e.g., using transmission component 1504 and/or communication manager 1506, depicted in FIG. 15) may transmit, to a second network node, an indication of a reference LTM configuration, as described above.

As further shown in FIG. 13, in some aspects, process 1300 may include receiving, from the second network node, an indication of one or more candidate cell configurations associated with one or more candidate cells for an LTM procedure, wherein the one or more candidate cell configurations are based at least in part on the reference LTM configuration (block 1320). For example, the first network node (e.g., using reception component 1502 and/or communication manager 1506, depicted in FIG. 15) may receive, from the second network node, an indication of one or more candidate cell configurations associated with one or more candidate cells for an LTM procedure, wherein the one or more candidate cell configurations are based at least in part on the reference LTM configuration, as described above.

Process 1300 may include additional aspects, such as any single aspect or any combination of aspects described below and/or in connection with one or more other processes described elsewhere herein.

In a first aspect, the second network node is a distributed unit of a network entity, and the first network node is a centralized unit of a network entity.

In a second aspect, alone or in combination with the first aspect, process 1300 further includes transmitting, to the second network node, an indication of source cell information associated with a source cell of a UE, wherein the one or more candidate cell configurations are further based at least in part on the source cell information.

In a third aspect, alone or in combination with one or more of the first and second aspects, the one or more candidate cell configurations are associated with a candidate cell group configuration.

In a fourth aspect, alone or in combination with one or more of the first through third aspects, the one or more candidate cell configurations are associated with one or more delta configurations with respect to the reference LTM configuration.

In a fifth aspect, alone or in combination with one or more of the first through fourth aspects, process 1300 further includes receiving, from the second network node, an indication that the one or more candidate cell configurations are associated with the one or more delta configurations.

In a sixth aspect, alone or in combination with one or more of the first through fifth aspects, the one or more candidate cell configurations are associated with one or more full configurations.

In a seventh aspect, alone or in combination with one or more of the first through sixth aspects, process 1300 further includes receiving, from the second network node, an indication that the one or more candidate cell configurations are associated with the one or more full configurations.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
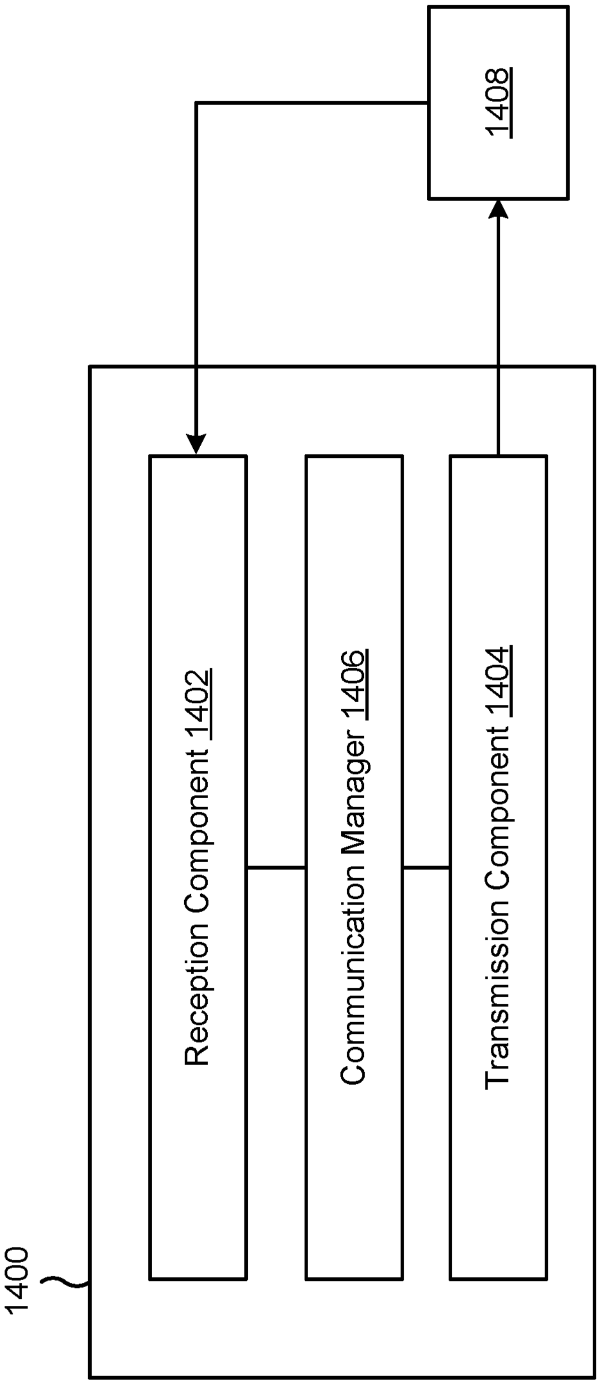
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 140 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 7-8B. Additionally, or alternatively, the apparatus 1400 may be configured to perform one or more processes described herein, such as process 900 of FIG. 9. In some aspects, the apparatus 1400 and/or one or more components shown in FIG. 14 may include one or more components of the UE 120 described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE 120 described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the UE 120 described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The reception component 1402 may receive a reference LTM configuration indicating one or more reference SpCell configurations and zero or more reference SCell configurations. The reception component 1402 may receive one or more candidate cell group configurations, each of the one or more candidate cell group configurations indicating one or more delta configurations with respect to at least one of the one or more reference SpCell configurations or the zero or more reference SCell configurations. The communication manager 1406 may perform an LTM procedure associated with a selected candidate cell group configuration, of the one or more candidate cell group configurations.

The reception component 1402 may receive an indication of multiple reference LTM configurations, wherein the reference LTM configuration is a selected one of the multiple reference LTM configurations receiving an indication that the reference LTM configuration was selected from multiple reference LTM configurations for preparing the one or more delta configurations.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
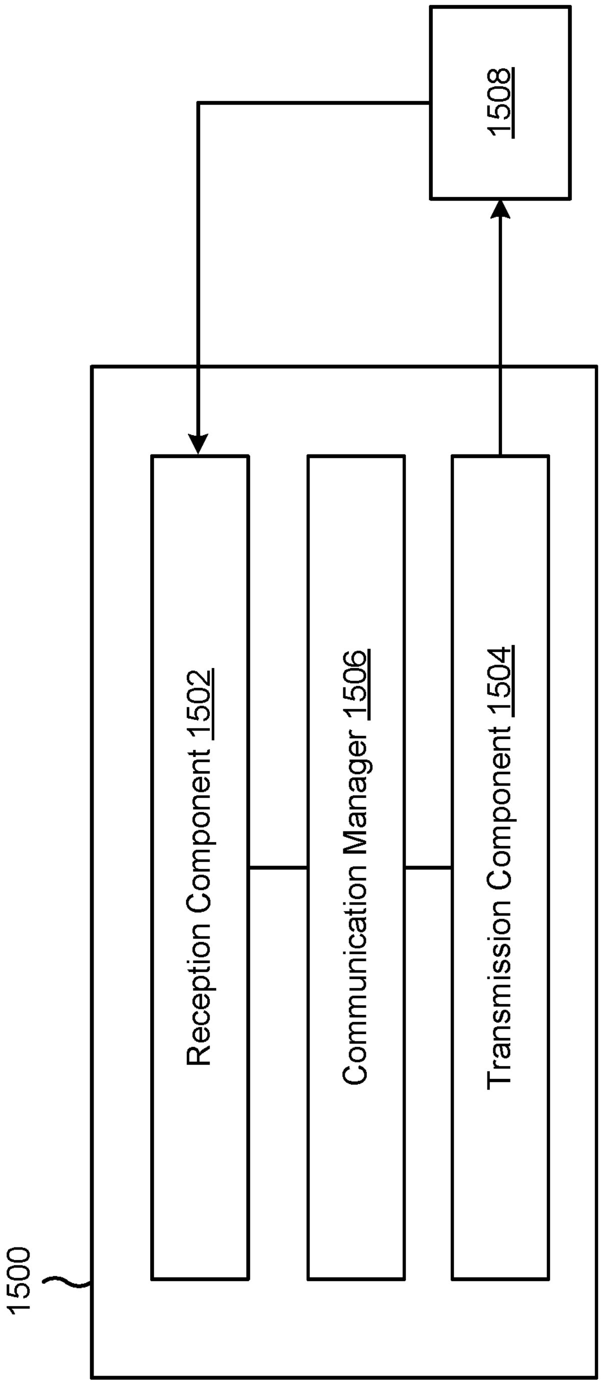
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 150 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 7-8B. Additionally, or alternatively, the apparatus 1500 may be configured to perform one or more processes described herein, such as process 1000 of FIG. 10, process 1100 of FIG. 11, process 1200 of FIG. 12, or a combination thereof. In some aspects, the apparatus 1500 and/or one or more components shown in FIG. 15 may include one or more components of the network node 110 described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node 110 described in connection with FIG. 2. In some aspects, the reception component 1502 and/or the transmission component 1504 may include or may be included in a network interface. The network interface may be configured to obtain and/or output signals for the apparatus 1500 via one or more communications links, such as a backhaul link, a midhaul link, and/or a fronthaul link.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/processor, a memory, or a combination thereof, of the network node 110 described in connection with FIG. 2. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

The transmission component 1504 may transmit, to a UE, a reference LTM configuration indicating one or more reference SpCell configurations and zero or more reference SCell configurations. The transmission component 1504 may transmit, to the UE, one or more candidate cell group configurations, each of the one or more candidate cell group configurations indicating one or more delta configurations with respect to at least one of the one or more reference SpCell configurations or the zero or more reference SCell configurations. The communication manager 1506 may trigger, at the UE, an LTM procedure associated with a selected candidate cell group configuration, of the one or more candidate cell group configurations.

The transmission component 1504 may transmit, to the UE, an indication of multiple reference LTM configurations, wherein the reference LTM configuration is a selected one of the multiple reference LTM configurations transmitting, to the UE, an indication that the reference LTM configuration was selected from multiple reference LTM configurations for preparing the one or more delta configurations.

The reception component 1502 may receive, from a second network node, an indication of a reference LTM configuration. The communication manager 1506 may identify, based at least in part on the reference LTM configuration, one or more candidate cell configurations associated with one or more candidate cells for an LTM procedure. The transmission component 1504 may transmit, to the second network node, an indication of the one or more candidate cell configurations.

The reception component 1502 may receive, from the second network node, an indication of source cell information associated with a source cell of a UE, wherein identifying the one or more candidate cell configurations is further based at least in part on the source cell information.

The transmission component 1504 may transmit, to the second network node, an indication that the one or more candidate cell configurations are associated with the one or more delta configurations.

The reception component 1502 may receive, from the second network node, an indication of multiple reference LTM configurations, wherein the reference LTM configuration is a selected one of the multiple reference LTM configurations.

The transmission component 1504 may transmit, to the second network node, an indication that the reference LTM configuration was selected from the multiple reference LTM configurations for preparing the one or more delta configurations.

The transmission component 1504 may transmit, to the second network node, an indication that the one or more candidate cell configurations are associated with the one or more full configurations.

The reception component 1502 may receive, from a second network node, an indication of one or more candidate cell configurations associated with one or more candidate cells for a LTM procedure. The communication manager 1506 may identify, based at least in part on the one or more candidate cell configurations and a reference LTM configuration, one or more delta configurations with respect to the reference LTM configuration for the one or more candidate cells. The transmission component 1504 may transmit, to a UE, an indication of the one or more delta configurations.

The transmission component 1504 may transmit, to the second network node, an indication that the one or more candidate cell configurations are to be provided as full configurations.

The reception component 1502 may receive, from the second network node and based at least in part on the indication that the one or more candidate cell configurations are to be provided as full configurations, one or more full configurations for the one or more candidate cells.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a UE, comprising: receiving a reference LTM configuration indicating one or more reference SpCell configurations and zero or more reference SCell configurations; receiving one or more candidate cell group configurations, each of the one or more candidate cell group configurations indicating one or more delta configurations with respect to at least one of the one or more reference SpCell configurations or the zero or more reference SCell configurations; and performing an LTM procedure associated with a selected candidate cell group configuration, of the one or more candidate cell group configurations.

Aspect 2: The method of Aspect 1, wherein the selected candidate cell group configuration is associated with a candidate SpCell configuration, and wherein the candidate SpCell configuration is indicated as a delta configuration with respect to a reference SpCell configuration, of the one or more reference SpCell configurations.

Aspect 3: The method of any of Aspects 1-2, wherein the reference LTM configuration indicates a reference SCell configuration, wherein the selected candidate cell group configuration indicates a candidate SCell configuration, and wherein the candidate SCell configuration is indicated as a delta configuration with respect to the reference SCell configuration.

Aspect 4: The method of any of Aspects 1-3, wherein the reference LTM configuration indicates one or more reference SCell configurations, each associated with a respective SCell index, wherein the selected candidate cell group configuration indicates one or more candidate SCell configurations, each associated with a respective SCell index, and wherein each candidate SCell configuration, of the one or more candidate SCell configurations, is indicated as a delta configuration with respect to a reference SCell configuration associated with a same respective SCell index as the candidate SCell configuration.

Aspect 5: The method of any of Aspects 1-4, wherein the reference LTM configuration indicates one or more reference SCell configurations, wherein the selected candidate cell group configuration indicates a candidate SpCell configuration, and wherein the candidate SpCell configuration is indicated as a delta configuration with respect to a reference SCell configuration, of the one or more reference SCell configurations.

Aspect 6: The method of any of Aspects 1-5, wherein the selected candidate cell group configuration indicates one or more candidate SCell configurations, and wherein each candidate SCell configuration, of the one or more candidate SCell configurations, is indicated as a delta configuration with respect to a reference SpCell configuration, of the one or more reference SpCell configurations.

Aspect 7: The method of any of Aspects 1-6, wherein the selected candidate cell group configuration indicates a candidate SpCell configuration, and wherein the candidate SpCell configuration is indicated as a delta configuration with respect to a reference SpCell configuration, of the one or more SpCell configurations, that is indicated by the candidate SpCell configuration.

Aspect 8: The method of any of Aspects 1-7, wherein at least one candidate cell group configuration, of the one or more candidate cell group configurations, includes at least one of a full candidate SpCell configuration or a full candidate SCell configuration.

Aspect 9: The method of any of Aspects 1-8, wherein at least one candidate cell group configuration, of the one or more candidate cell group configurations, includes an indication that the at least one of the one or more reference SpCell configurations or the zero or more reference SCell configurations are associated with the one or more delta configurations.

Aspect 10: The method of any of Aspects 1-9, further comprising receiving an indication of multiple reference LTM configurations, wherein the reference LTM configuration is a selected one of the multiple reference LTM configurations; and receiving an indication that the reference LTM configuration was selected from multiple reference LTM configurations for preparing the one or more delta configurations.

Aspect 11: A method of wireless communication performed by a network node, comprising: transmitting, to a UE, a reference LTM configuration indicating one or more reference SpCell configurations and zero or more reference SCell configurations; transmitting, to the UE, one or more candidate cell group configurations, each of the one or more candidate cell group configurations indicating one or more delta configurations with respect to at least one of the one or more reference SpCell configurations or the zero or more reference SCell configurations; and triggering, at the UE, an LTM procedure associated with a selected candidate cell group configuration, of the one or more candidate cell group configurations.

Aspect 12: The method of Aspect 11, wherein the selected candidate cell group configuration is associated with a candidate SpCell configuration, and wherein the candidate SpCell configuration is indicated as a delta configuration with respect to a reference SpCell configuration, of the one or more reference SpCell configurations.

Aspect 13: The method of any of Aspects 11-12, wherein the reference LTM configuration indicates a reference SCell configuration, wherein the selected candidate cell group configuration indicates a candidate SCell configuration, and wherein the candidate SCell configuration is indicated as a delta configuration with respect to the reference SCell configuration.

Aspect 14: The method of any of Aspects 11-13, wherein the reference LTM configuration indicates one or more reference SCell configurations, each associated with a respective SCell index, wherein the selected candidate cell group configuration indicates one or more candidate SCell configurations, each associated with a respective SCell index, and wherein each candidate SCell configuration, of the one or more candidate SCell configurations, is indicated as a delta configuration with respect to a reference SCell configuration associated with a same respective SCell index as the candidate SCell configuration.

Aspect 15: The method of any of Aspects 11-14, wherein the reference LTM configuration indicates one or more reference SCell configurations, wherein the selected candidate cell group configuration indicates a candidate SpCell configuration, and wherein the candidate SpCell configuration is indicated as a delta configuration with respect to a reference SCell configuration, of the one or more reference SCell configurations.

Aspect 16: The method of any of Aspects 11-15, wherein the selected candidate cell group configuration indicates one or more candidate SCell configurations, and wherein each candidate SCell configuration, of the one or more candidate SCell configurations, is indicated as a delta configuration with respect to a reference SpCell configuration, of the one or more reference SpCell configurations.

Aspect 17: The method of any of Aspects 11-16, wherein the selected candidate cell group configuration indicates a candidate SpCell configuration, and wherein the candidate SpCell configuration is indicated as a delta configuration with respect to a reference SpCell configuration, of the one or more SpCell configurations, that is indicated by the candidate SpCell configuration.

Aspect 18: The method of any of Aspects 11-17, wherein at least one candidate cell group configuration, of the one or more candidate cell group configurations, includes at least one of a full candidate SpCell configuration or a full candidate SCell configuration.

Aspect 19: The method of any of Aspects 11-18, wherein at least one candidate cell group configuration, of the one or more candidate cell group configurations, includes an indication that the at least one of the one or more reference SpCell configurations or the zero or more reference SCell configurations are associated with the one or more delta configurations.

Aspect 20: The method of any of Aspects 11-19, further comprising transmitting, to the UE, an indication of multiple reference LTM configurations, wherein the reference LTM configuration is a selected one of the multiple reference LTM configurations; and transmitting, to the UE, an indication that the reference LTM configuration was selected from multiple reference LTM configurations for preparing the one or more delta configurations.

Aspect 21: A method of wireless communication performed by a first network node, comprising: receiving, from a second network node, an indication of a reference LTM configuration; identifying, based at least in part on the reference LTM configuration, one or more candidate cell configurations associated with one or more candidate cells for an LTM procedure; and transmitting, to the second network node, an indication of the one or more candidate cell configurations.

Aspect 22: The method of Aspect 21, wherein the first network node is a distributed unit of a network entity, and wherein the second network node is a centralized unit of a network entity.

Aspect 23: The method of any of Aspects 21-22, further comprising receiving, from the second network node, an indication of source cell information associated with a source cell of a UE, wherein identifying the one or more candidate cell configurations is further based at least in part on the source cell information.

Aspect 24: The method of any of Aspects 21-23, wherein the one or more candidate cell configurations are associated with a candidate cell group configuration.

Aspect 25: The method of any of Aspects 21-24, wherein the one or more candidate cell configurations are associated with one or more delta configurations with respect to the reference LTM configuration.

Aspect 26: The method of Aspect 25, further comprising transmitting, to the second network node, an indication that the one or more candidate cell configurations are associated with the one or more delta configurations.

Aspect 27: The method of Aspect 25, further comprising: receiving, from the second network node, an indication of multiple reference LTM configurations, wherein the reference LTM configuration is a selected one of the multiple reference LTM configurations; and transmitting, to the second network node, an indication that the reference LTM configuration was selected from the multiple reference LTM configurations for preparing the one or more delta configurations.

Aspect 28: The method of any of Aspects 21-27, wherein the one or more candidate cell configurations are associated with one or more full configurations.

Aspect 29: The method of Aspect 28, further comprising transmitting, to the second network node, an indication that the one or more candidate cell configurations are associated with the one or more full configurations.

Aspect 30: A method of wireless communication performed by a first network node, comprising: receiving, from a second network node, an indication of one or more candidate cell configurations associated with one or more candidate cells for an LTM procedure; identifying, based at least in part on the one or more candidate cell configurations and a reference LTM configuration, one or more delta configurations with respect to the reference LTM configuration for the one or more candidate cells; and transmitting, to a UE, an indication of the one or more delta configurations.

Aspect 31: The method of Aspect 30, wherein the first network node is a centralized unit of a network entity, and wherein the second network node is a distributed unit of a network entity.

Aspect 32: The method of any of Aspects 30-31, wherein the one or more candidate cell configurations are associated with a candidate cell group configuration.

Aspect 33: The method of any of Aspects 30-32, wherein the one or more delta configurations are associated with a candidate cell group configuration.

Aspect 34: The method of any of Aspects 30-33, further comprising: transmitting, to the second network node, an indication that the one or more candidate cell configurations are to be provided as full configurations; and receiving, from the second network node and based at least in part on the indication that the one or more candidate cell configurations are to be provided as full configurations, one or more full configurations for the one or more candidate cells.

Aspect 35: A method of wireless communication performed by a first network node, comprising: transmitting, to a second network node, an indication of a reference layer 1/layer 2 triggered mobility (LTM) configuration; and receiving, from the second network node, an indication of one or more candidate cell configurations associated with one or more candidate cells for an LTM procedure, wherein the one or more candidate cell configurations are based at least in part on the reference LTM configuration.

Aspect 36: The method of Aspect 35, wherein the second network node is a distributed unit of a network entity, and wherein the first network node is a centralized unit of a network entity.

Aspect 37: The method of any of Aspects 35-36, further comprising transmitting, to the second network node, an indication of source cell information associated with a source cell of a user equipment (UE), wherein the one or more candidate cell configurations are further based at least in part on the source cell information.

Aspect 38: The method of any of Aspects 35-37, wherein the one or more candidate cell configurations are associated with a candidate cell group configuration.

Aspect 39: The method of any of Aspects 35-38, wherein the one or more candidate cell configurations are associated with one or more delta configurations with respect to the reference LTM configuration.

Aspect 40: The method of Aspects 39, further comprising receiving, from the second network node, an indication that the one or more candidate cell configurations are associated with the one or more delta configurations.

Aspect 41: The method of any of Aspects 35-38, wherein the one or more candidate cell configurations are associated with one or more full configurations.

Aspect 42: The method of Aspect 41, wherein the one or more processors are further configured to receive, from the second network node, an indication that the one or more candidate cell configurations are associated with the one or more full configurations.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node for wireless communication, comprising:

one or more memories; and one or more processors, coupled to the one or more memories, configured to:

receive, from a second network node, as part of a user equipment (UE) context modification request, an indication of a reference layer 1/layer 2 triggered mobility (LTM) configuration; and transmit, to the second network node, as part of a UE context modification response, and based at least in part on the reference LTM configuration, one or more candidate cell configurations associated with one or more candidate cells for an LTM procedure, wherein the first network node is a distributed unit, and wherein the second network node is a centralized unit.

2. The first network node of claim 1, wherein the one or more processors are further configured to receive, from the second network node, an indication of source cell information associated with a source cell of a user equipment (UE), wherein transmitting the one or more candidate cell configurations is further based at least in part on the source cell information.

3. The first network node of claim 1, wherein the one or more candidate cell configurations are associated with a candidate cell group configuration.

4. The first network node of claim 1, wherein the one or more candidate cell configurations are associated with one or more delta configurations with respect to the reference LTM configuration.

5. The first network node of claim 4, wherein the one or more processors are further configured to transmit, to the second network node, an indication that the one or more candidate cell configurations are associated with the one or more delta configurations.

6. The first network node of claim 1, wherein the one or more candidate cell configurations are associated with one or more full configurations.

7. The first network node of claim 6, wherein the one or more processors are further configured to transmit, to the second network node, an indication that the one or more candidate cell configurations are associated with the one or more full configurations.

8. The first network node of claim 1, wherein the indication of the reference LTM configuration comprises an indication of the one or more candidate cells.

9. A first network node for wireless communication, comprising:

one or more memories; and one or more processors, coupled to the one or more memories, configured to:

transmit, to a second network node, as part of a user equipment (UE) context modification request, an indication of a reference layer 1/layer 2 triggered mobility (LTM) configuration; and receive, from the second network node, as part of a UE context modification response, one or more candidate cell configurations associated with one or more candidate cells for an LTM procedure, wherein the one or more candidate cell configurations are based at least in part on the reference LTM configuration, wherein the second network node is a distributed unit, and wherein the first network node is a centralized unit.

10. The first network node of claim 9, wherein the one or more processors are further configured to transmit, to the second network node, an indication of source cell information associated with a source cell of a user equipment (UE), wherein the one or more candidate cell configurations are further based at least in part on the source cell information.

11. The first network node of claim 9, wherein the one or more candidate cell configurations are associated with a candidate cell group configuration.

12. The first network node of claim 9, wherein the one or more candidate cell configurations are associated with one or more delta configurations with respect to the reference LTM configuration.

13. The first network node of claim 12, wherein the one or more processors are further configured to receive, from the second network node, an indication that the one or more candidate cell configurations are associated with the one or more delta configurations.

14. The first network node of claim 9, wherein the one or more candidate cell configurations are associated with one or more full configurations.

15. The first network node of claim 14, wherein the one or more processors are further configured to receive, from the second network node, an indication that the one or more candidate cell configurations are associated with the one or more full configurations.

16. The first network node of claim 9, wherein the indication of the reference LTM configuration comprises an indication of the one or more candidate cells.

17. A method of wireless communication performed by a first network node, comprising:

receiving, from a second network node, as part of a user equipment (UE) context modification request, an indication of a reference layer 1/layer 2 triggered mobility (LTM) configuration; and transmitting, to the second network node, as part of a UE context modification response, and based at least in part on the reference LTM configuration, one or more candidate cell configurations associated with one or more candidate cells for an LTM procedure, wherein the first network node is a distributed unit, and wherein the second network node is a centralized unit.

18. The method of claim 17, wherein the one or more candidate cell configurations are associated with a candidate cell group configuration.

19. The method of claim 17, wherein the one or more candidate cell configurations are associated with one or more delta configurations with respect to the reference LTM configuration.

20. The method of claim 17, wherein the one or more candidate cell configurations are associated with one or more full configurations.

* * * * *